(12) United States Patent
Li et al.

(10) Patent No.: US 10,942,625 B1
(45) Date of Patent: Mar. 9, 2021

(54) COORDINATED DISPLAY OF SOFTWARE APPLICATION INTERFACES

(71) Applicants: Atlassian PTY Ltd., Sydney (AU); Atlassian Inc., San Francisco, CA (US)

(72) Inventors: Shuai Li, Sunnyvale, CA (US); Jerry Cheng, Mountain View, CA (US)

(73) Assignees: Atlassian PTY Ltd., Sydney (AU); Atlassian, Inc., San Francisco, CA (US)

( * ) Notice: Subject to any disclaimer, the term of this patent is extended or adjusted under 35 U.S.C. 154(b) by 0 days.

(21) Appl. No.: 16/564,419

(22) Filed: Sep. 9, 2019

(51) Int. Cl.
G06F 3/048 (2013.01)
G06F 3/0482 (2013.01)
G06F 9/54 (2006.01)
G06F 3/14 (2006.01)

(52) U.S. Cl.
CPC .......... G06F 3/0482 (2013.01); G06F 3/1407 (2013.01); G06F 9/542 (2013.01); G06F 2203/04803 (2013.01)

(58) Field of Classification Search
None
See application file for complete search history.

(56) References Cited

U.S. PATENT DOCUMENTS

| | | | |
|---|---|---|---|
| 9,621,887 B2 * | 4/2017 | Rossato | H04N 19/126 |
| 10,505,825 B1 * | 12/2019 | Bettaiah | H04L 43/04 |
| 2004/0225648 A1 * | 11/2004 | Ransom | G06Q 10/10 |
| 2005/0060211 A1 * | 3/2005 | Xiao | G16H 40/20 |
| | | | 705/6 |
| 2007/0112759 A1 * | 5/2007 | Kulakow | G06F 16/951 |
| 2009/0142332 A1 * | 6/2009 | Ried | G01N 33/57419 |
| | | | 424/130.1 |
| 2009/0265661 A1 * | 10/2009 | Shuster | G06F 3/1454 |
| | | | 715/797 |
| 2015/0338888 A1 * | 11/2015 | Kim | G06F 3/04886 |
| | | | 345/156 |
| 2016/0030008 A1 * | 2/2016 | Gerard | G06T 7/30 |
| | | | 600/440 |
| 2016/0170998 A1 * | 6/2016 | Frank | H04W 4/021 |
| | | | 707/748 |
| 2017/0266533 A1 * | 9/2017 | Dalebout | A63B 71/0622 |
| 2017/0367651 A1 * | 12/2017 | Tzvieli | A61B 5/0816 |
| 2017/0371610 A1 * | 12/2017 | Li | H04M 1/72527 |
| 2018/0150817 A1 * | 5/2018 | Han | G07F 7/088 |
| 2018/0304145 A1 * | 10/2018 | Finnerty | G07C 15/005 |

(Continued)

Primary Examiner — Hua Lu
(74) Attorney, Agent, or Firm — Alston & Bird LLP

(57) ABSTRACT

Systems and methods provide techniques for providing coordinated display of software applications. In one embodiments, a method for enabling a first software application to enter a co-display mode with a second software application includes obtaining a co-display notification associated with the second software application; determining an overlay region within the first display region; generating a display update request, wherein the display update request is configured to cause the computing device to display a transparent overlay user interface element over the overlay region; causing the computing device to transmit co-display information to the second software application; and causing the computing device to update display of a first application interface associated with the first software application in accordance with the display update request.

20 Claims, 19 Drawing Sheets

(56) References Cited

U.S. PATENT DOCUMENTS

2018/0335921 A1* 11/2018 Karunamuni ......... G06F 3/0488
2018/0335939 A1* 11/2018 Karunamuni ............ G06F 8/38
2019/0258933 A1*  8/2019 Baughman ............ H04L 67/025

* cited by examiner

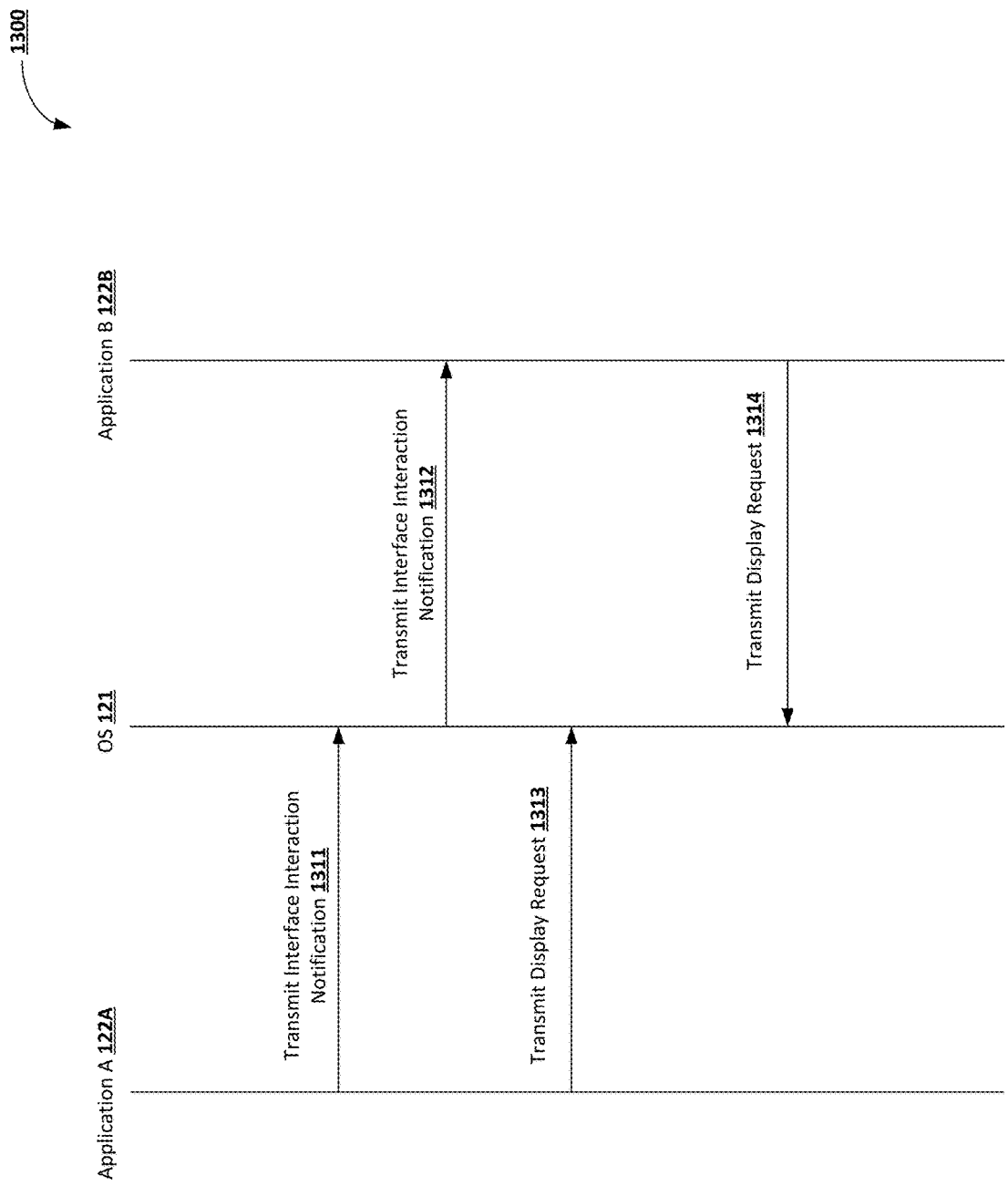

COORDINATED DISPLAY OF SOFTWARE APPLICATION INTERFACES

BACKGROUND

Various methods, apparatuses, and systems are configured to provide techniques for coordinated display of software application interfaces. Applicant has identified many deficiencies and problems associated with existing methods, apparatuses, and systems for coordinated display of software application interfaces. Through applied effort, ingenuity, and innovation, these identified deficiencies and problems have been solved by developing solutions that are in accordance with the embodiments of the present invention, many examples of which are described in detail herein.

BRIEF SUMMARY

In general, embodiments of the present invention provide methods, apparatuses, systems, computing devices, and/or the like that are configured to enable coordinated display of software application interfaces. For example, certain embodiments of the present invention provide methods, apparatuses, systems, computing devices, and/or the like that are configured to enable coordinated display of software application interfaces using at least one of transparent overlay user interfaces, co-display arrangements, co-display protocols, and co-displayed interface interaction solutions.

In accordance with one aspect of the present invention, a computer-implemented method for enabling a first software application executing on a computing device and being displayed within a first application display region of a display device associated with the computing device to enter a co-display mode with a second software application comprises: obtaining a co-display notification associated with the second software application executing on the computing device, wherein the co-display notification identifies the second software application; determining, based on the co-display notification and a co-display protocol associated with the first software application, an overlay region within the first display region; generating a display update request, wherein the display update request is configured to cause the computing device to display a transparent overlay user interface element over the overlay region; causing the computing device to transmit co-display information to the second software application; and causing the computing device to update display of the first application interface in accordance with the display update request.

In accordance with another aspect of the present invention, a computer-implemented method for enabling co-display functionalities for a first software application executing on a computing device in a non-active display mode, the computer-implemented method comprises: obtaining a display request for the first software application; in response to obtaining the display request, obtaining co-display information associated with the computing device; determining whether the co-display information indicates an overlay region of a display space of a display device associated with the computing device, wherein the overlay region is configured to display a transparent overlay user interface element over a currently-displayed application interface associated with a second software application; and in response to determining that the computing device indicates the overlay region, generating a display update request, wherein the display update request is configured to cause the computing device to display a first application interface associated with the first software application on the overlay region; and causing the computing device to update display of the currently-displayed application interface in accordance with the display update device.

Exemplary embodiments of one or both of the above-described aspects of the present invention are described below. Moreover, a person of ordinary skill in the relevant technology will recognize that the disclosed techniques can be performed using computer-implemented methods, computer systems, apparatuses, computer storage media, etc.

In some embodiments, the first software application is executing in an active display mode, the second software application is executing in a non-active display mode, and the co-display notification indicates an active display request associated with the second software application, wherein the active display request is configured to cause the second software application to transition from the active display mode to the non-active display mode.

In some embodiments, determining the overlay region comprises: generating one or more co-display arrangements for the first software application and the second software application, wherein each co-display arrangement is associated with a candidate overlay region; for each co-display arrangement of the one or more co-display arrangements, determining a predicted arrangement utility value; and determining the overlay region based on each predicted arrangement utility value for a co-display arrangement of the one or more co-display arrangements.

In some of the noted embodiments, determining the overlay region based on each predicted arrangement utility value comprises selecting the candidate overlay region for a particular co-display arrangement of the one or more co-display arrangements having a lowest predicted arrangement utility value as the overlay region. In some other of the noted embodiments, determining the predicted arrangement utility value for a particular co-display arrangement of the one or more co-display arrangement comprises: identifying a plurality of user interface elements associated with the particular co-display arrangement; for each user interface element of the plurality of user interface elements, determining an predicted element utility value; and determining the predicted arrangement utility value for the particular co-display arrangement based on each predicted element utility value for an user interface element of the plurality of user interface elements. In some embodiments, determining the predicted element utility value for a particular user interface element of the plurality of user interface elements comprises: determining an element co-display prominence value for the particular user interface element given the particular co-display arrangement based on an arranged display size of the particular user interface element given the co-display arrangement and an arranged display region of the particular user interface element given the co-display arrangement; obtain an element display significance value for the user interface element; and determining the predicted element utility value for the particular user interface element given the particular display arrangement based on the element co-display prominence value and the element display significance value.

In some embodiments, determining the overlay region comprises: identifying one or more interface regions of the first application interface; for each interface region of the one or more interface regions, selecting a predicted region significance value; and selecting the overlay region based on each predicted region utility value for an interface region of the one or more interface regions.

In some embodiments, the computer-implemented method further comprises obtaining an interface interaction request associated with the second application, wherein the interface interaction request is originated in the first application interface; generating an interface interaction notification based on the interface interaction request; and causing the computing device to transmit the interface interaction notification to the second application. In some of the noted embodiments, generating an interface update determination for the first application interface based on the interface interaction request; generating a second display update request based on the interface update determination; and causing the computing device to update display of the first application interface in accordance with the display update request. In some embodiments, generating the second display update request is performed in response to obtaining an interaction relevance confirmation associated with the second application. In some embodiments, obtaining an interface interaction request associated with the second application comprises: obtaining a storage location modification request, wherein the storage location modification request is originated in the first application interface. In some embodiments, obtaining an interface interaction request associated with the second application comprises: obtaining a data content modification request, wherein the data content modification request is originated in the first application interface.

In some embodiments, the computer-implemented method further comprises obtaining an interface interaction notification, wherein the interface interaction notification is originated in a second user application interface associated with the second application; generating an interface update determination for the first application interface based on the interface interaction notification; generating a second display update request based on the interface update determination; and causing the computing device to update display of the first application interface in accordance with the display update request. In some of the noted embodiments, the computer-implemented method further comprises, in response to causing the computing device to update display of the first application interface in accordance with the display update request, generating an interaction relevance confirmation based on the second display update request and causing the computing device to transmit the interaction relevance confirmation to the second application.

In some embodiments, the co-display information identifies the overlay region. In some embodiments, causing the computing device to update display of the first application interface in accordance with the display update request comprises: detecting that the second software application is being displayed within the overlay region, and in response to detecting that the second software application is being displayed within the overlay region, updating display of the first application interface to cease display of the first application interface within the overlay region. In some embodiments, causing the computing device to update display of the first application interface in accordance with the display update request comprises causing the computing device to display the first application interface in the co-display mode with the second software application.

BRIEF DESCRIPTION OF THE SEVERAL VIEW OF THE DRAWINGS

Having thus described some embodiments in general terms, references will now be made to the accompanying drawings, which are not drawn to scale, and wherein:

Figure 12A:
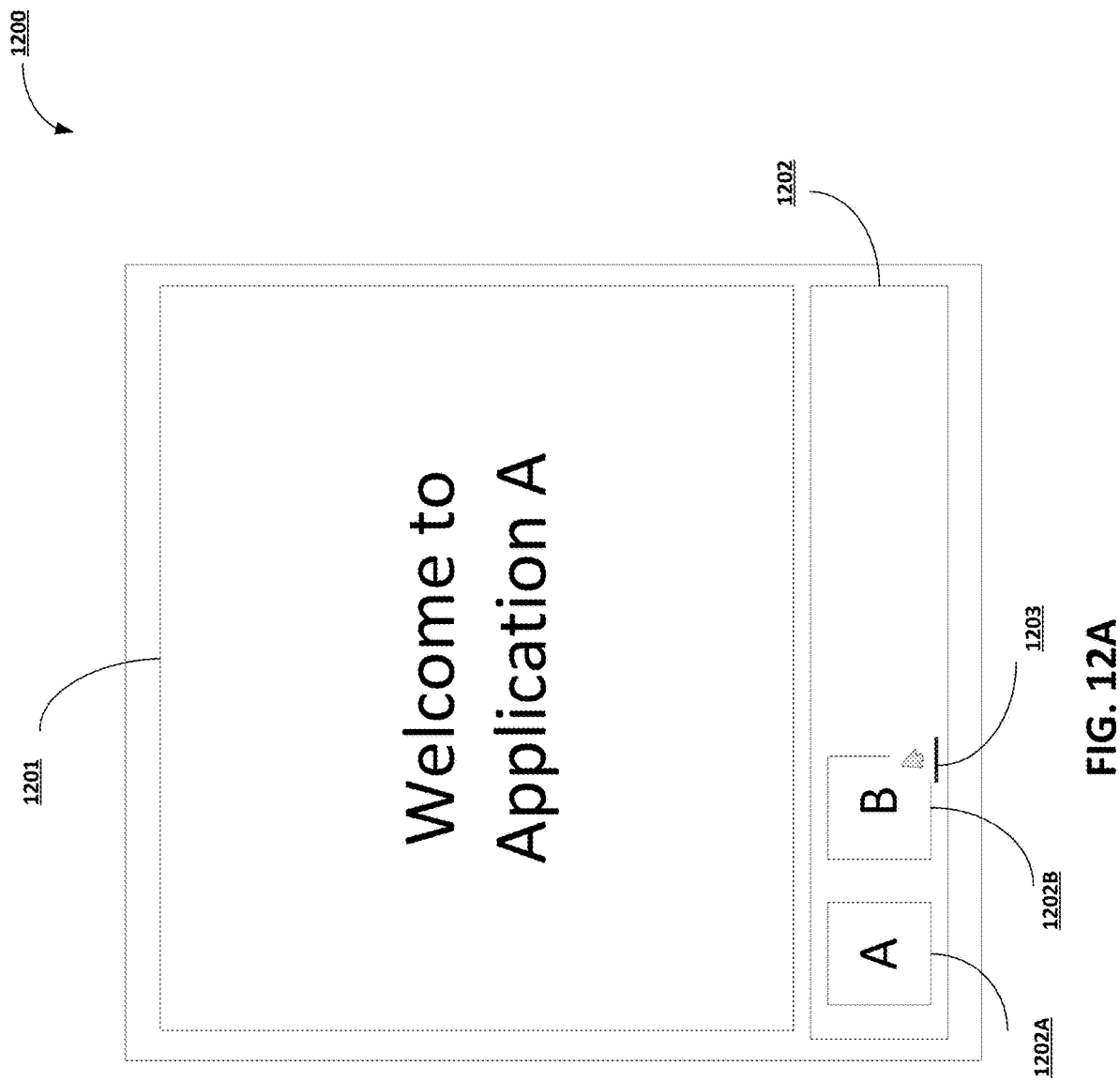
Figure 12B:
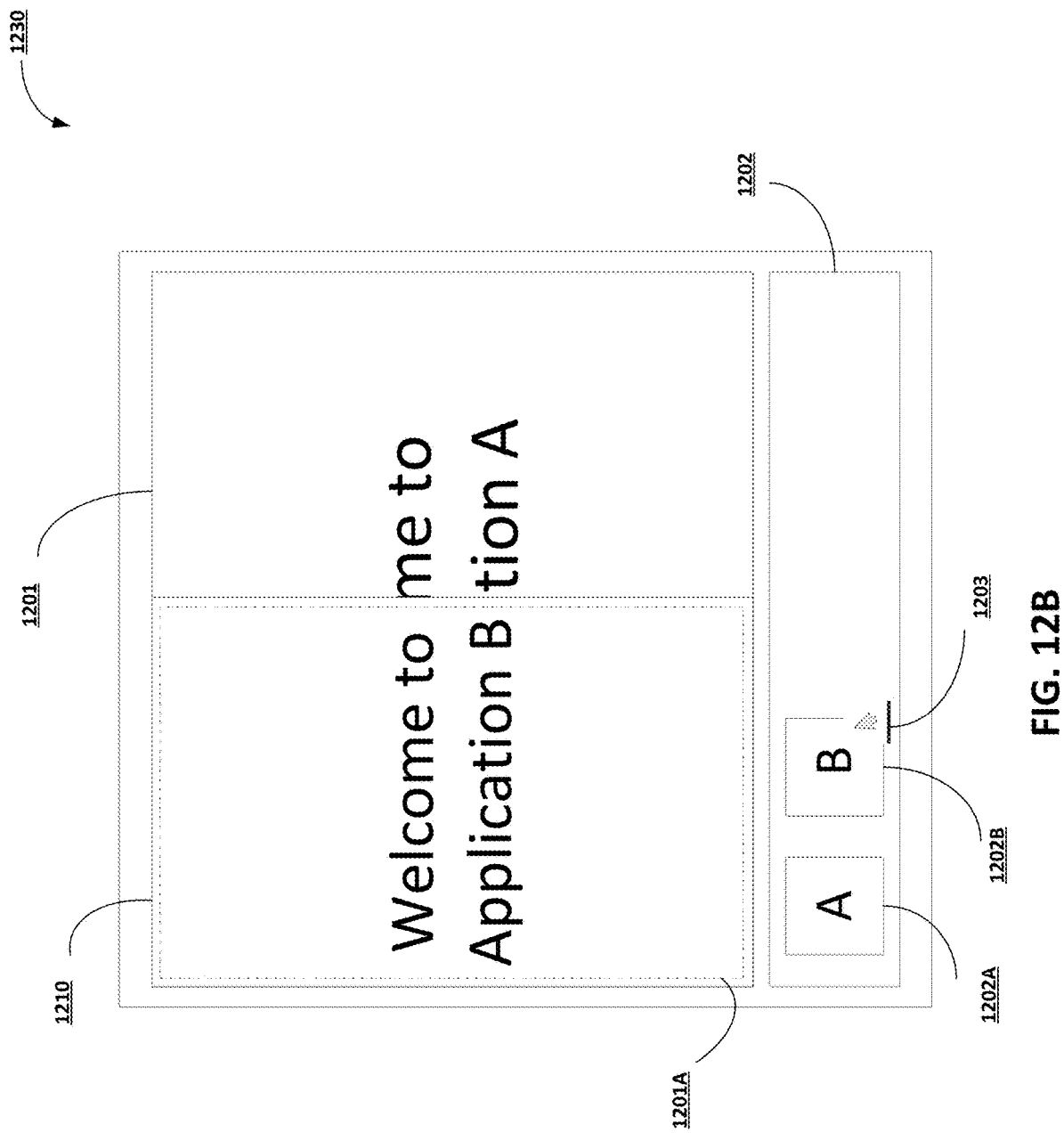
Figure 12C:
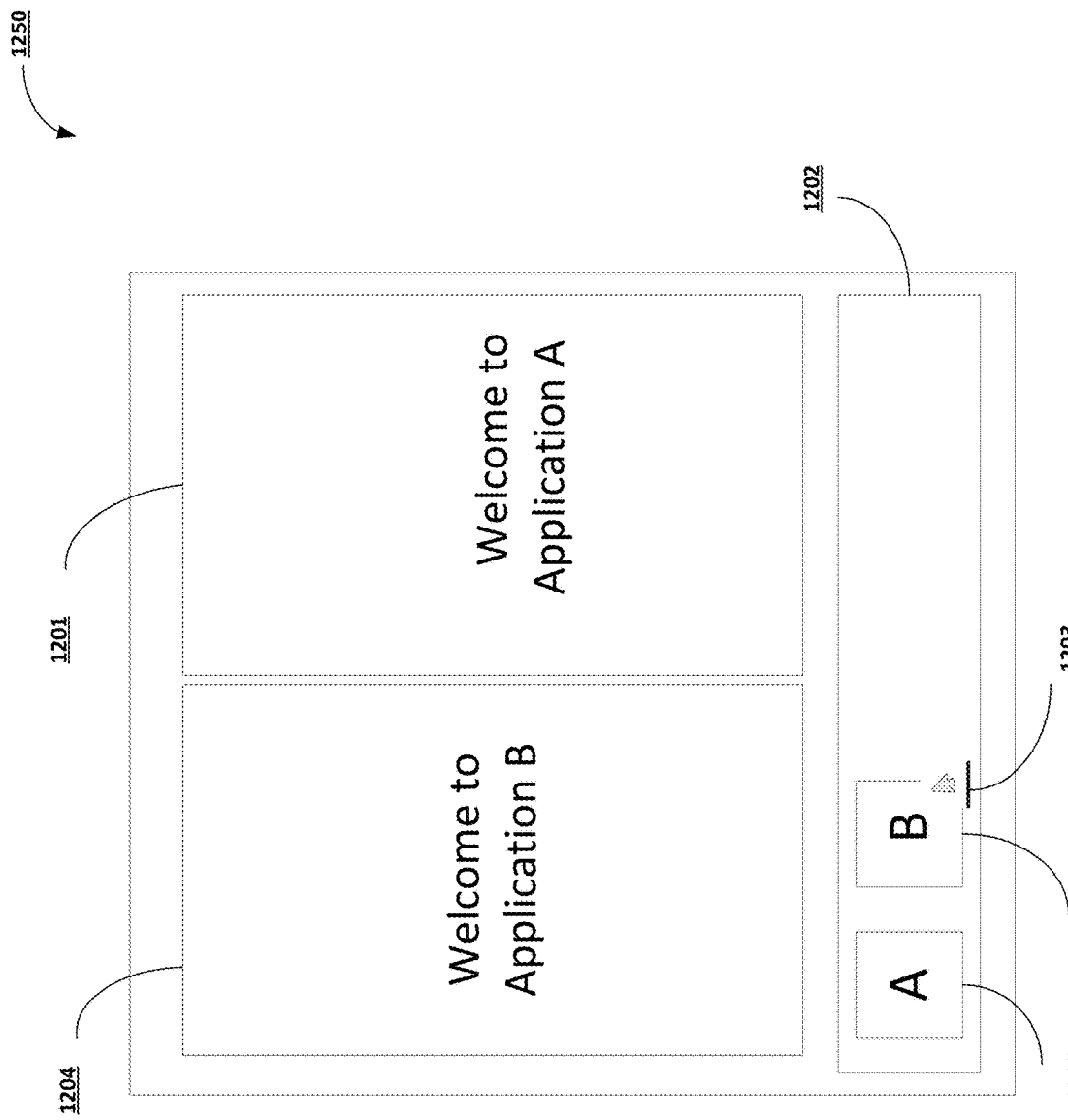

FIGS. 12A-12C provide an operational example of performing a transition of a software application from a non-active display mode to a co-display mode, in accordance with at least some embodiments of the present invention.

FIG. 13 is a transmission flow diagram of an example process for performing interface interactions between two software applications that are in a co-display mode with each other, in accordance with at least some embodiments of the present invention.

Figure 14:
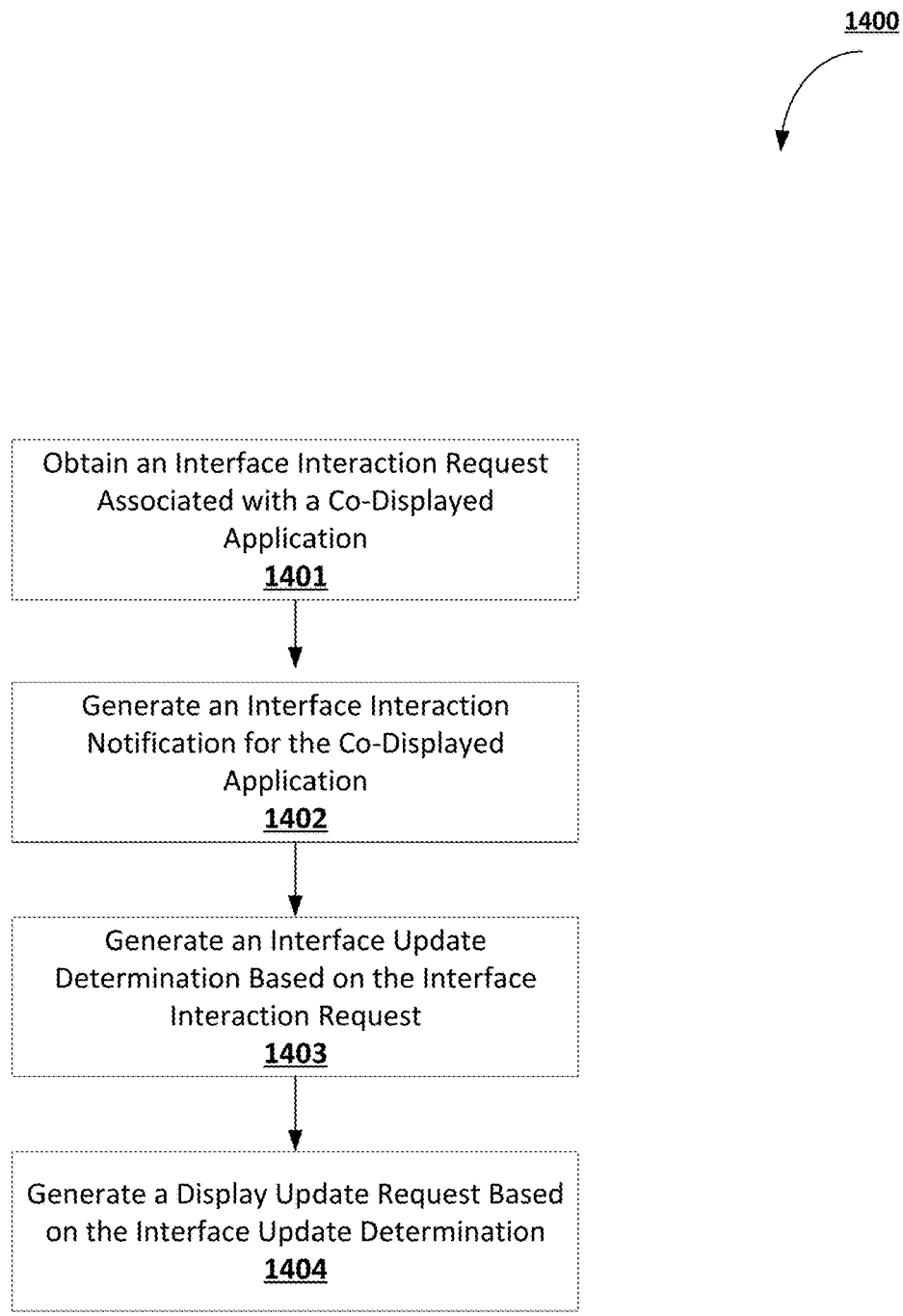

FIG. 14 is a flowchart diagram of an example process for processing an interface interaction request originated in a software application by the software application, in accordance with at least some embodiments of the present invention.

Figure 15:
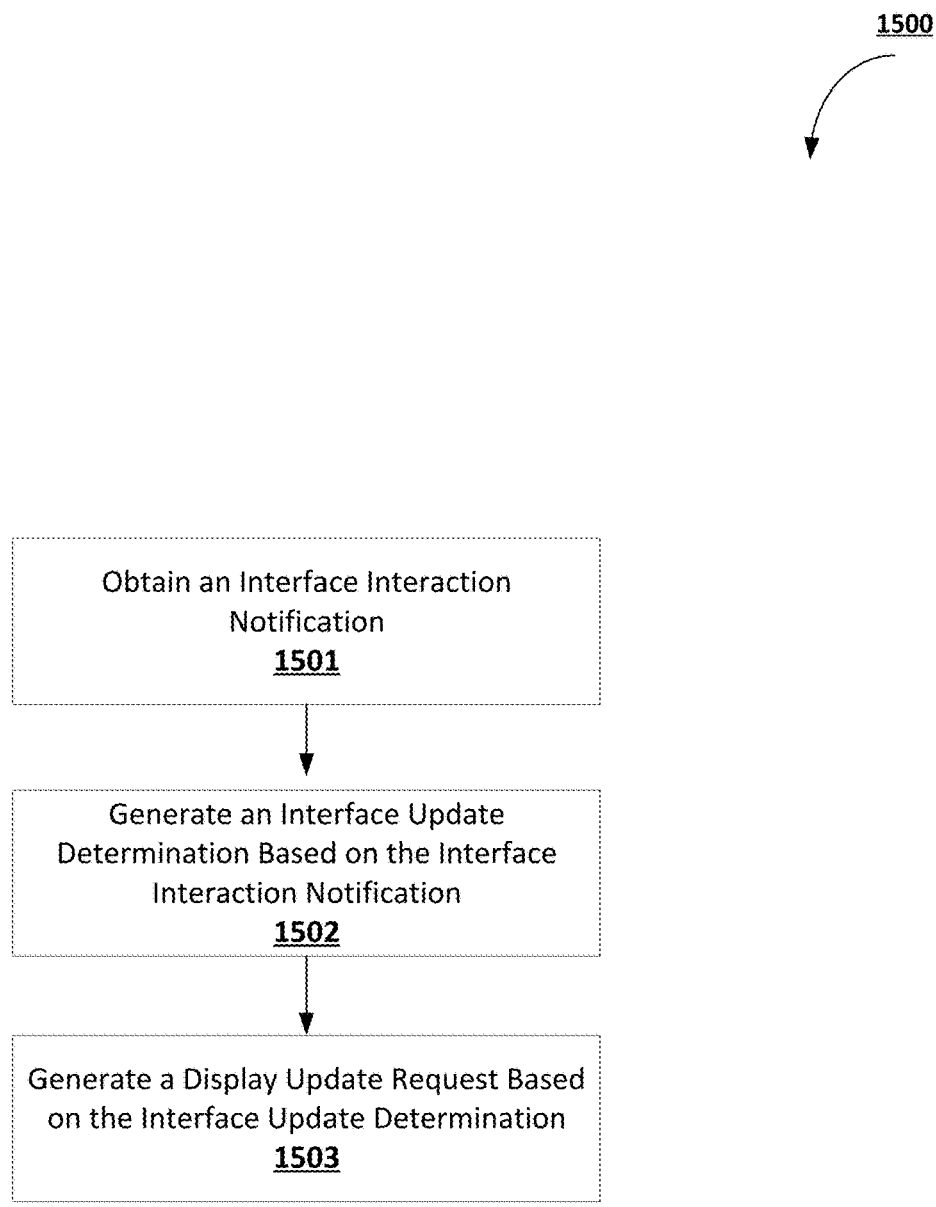

FIG. 15 is a flowchart diagram of an example process for processing an interface interaction notification associated with a first software application by a second software application, in accordance with at least some embodiments of the present invention.

Figure 16A:
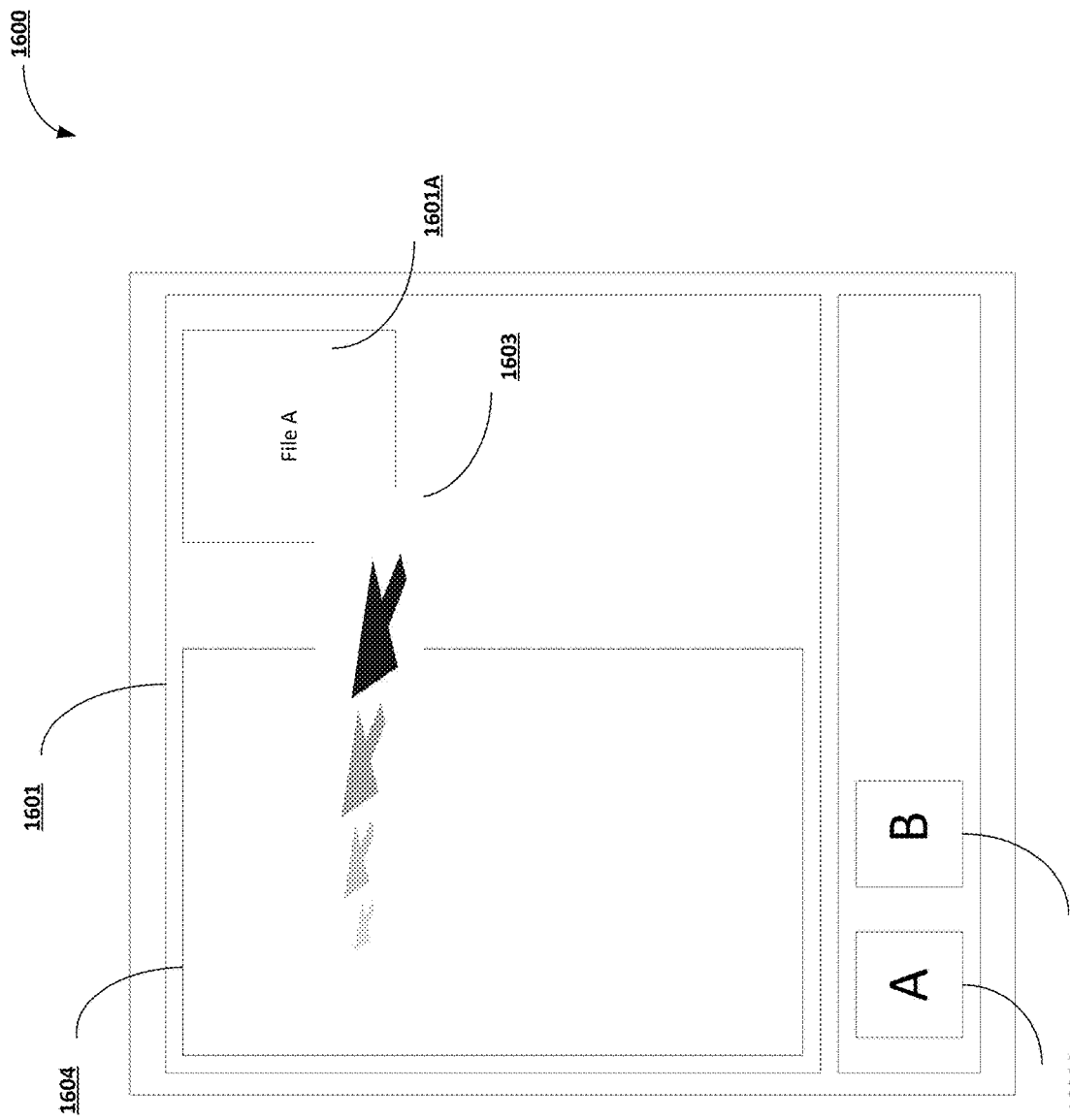
Figure 16B:
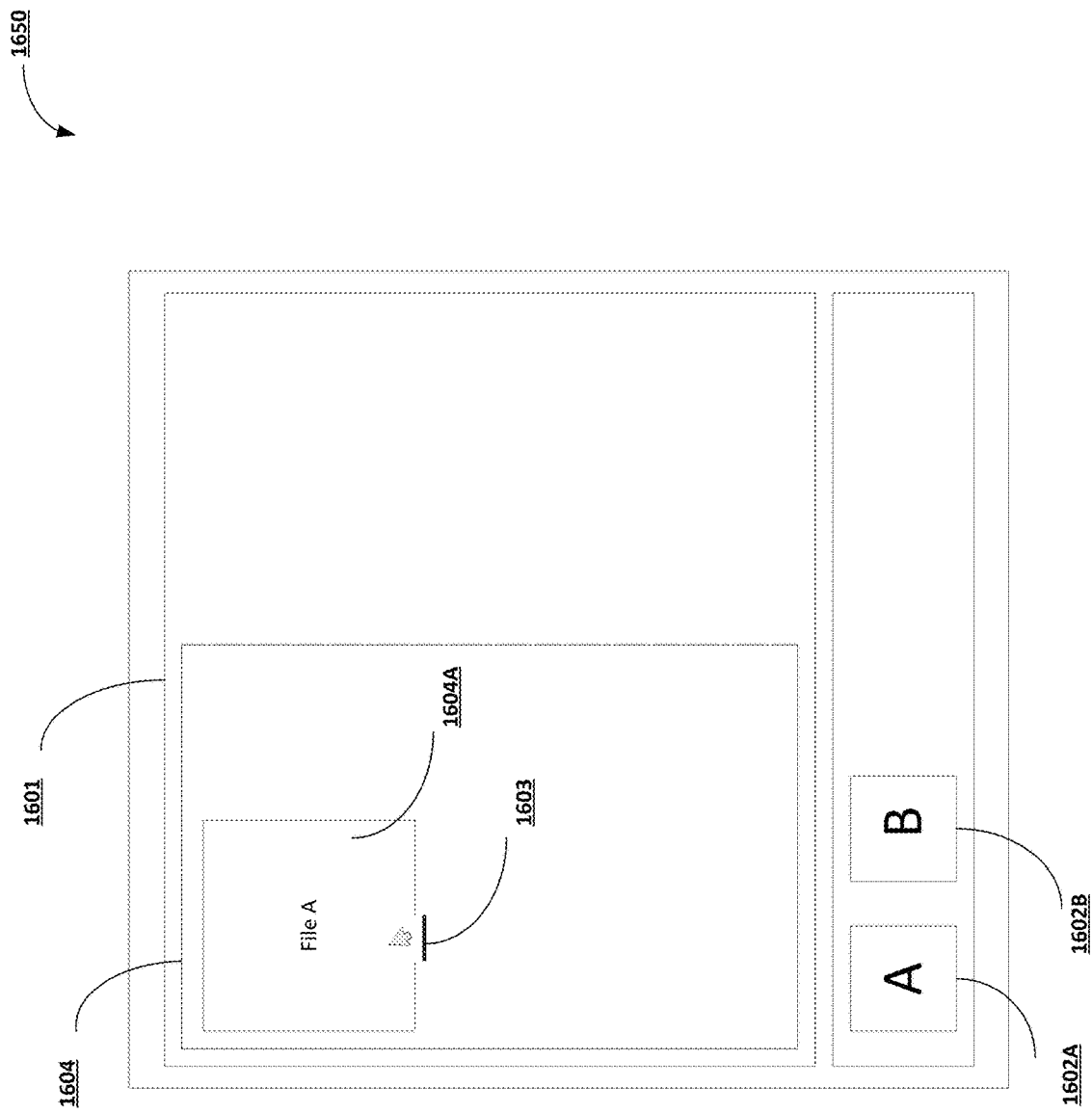

FIGS. 16A-16B provide an operational example of processing a storage location modification request, in accordance with at least some embodiments of the present invention.

DETAILED DESCRIPTION OF VARIOUS EMBODIMENTS

Various embodiments of the present invention now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present invention improve efficiency and reliability of performing coordinated display functionalities between application interfaces of various software applications. Performing coordinated display of application interfaces for diverse applications in a dynamic yet reliable manner while taking into account various application-specific properties, content-specific considerations, and/or user experience quality metrics can be computationally expensive. This is in part because display-enabling programs are generally under intense quality of service expectations. For example, many such programs are expected to enable real-time display of user-requested data with minimal delay or latency in order to enhance user experience quality and avoid creating a display quality bottleneck at the output stage of computer processing.

Accordingly, many existing coordinated display solutions are either non-dynamic (e.g., utilize static coordinated display enablement protocols and display space divisions), inefficient, or both. The technological limitations of existing coordinated display solutions have thus created a frustrating tradeoff between effectiveness of dynamic coordinated display solutions and efficiency of such systems. This tradeoff is especially consequential for various computing environments that lack extensive hardware capabilities for processing (e.g., for video processing), such as various smartphone-related and tablet-related computing environments. Various embodiments of the present invention address the technological limitations of existing coordinated display solutions by introducing computationally efficient solutions for enabling dynamic coordinated display of diverse software application interfaces. In doing so, various embodiments of the present invention increase the capacity of computing environments with lower levels of hardware capability to perform real-time dynamic coordinated display of diverse software application interfaces.

For example, various embodiments of the present invention enable efficient yet dynamic coordinated display of software applications by defining co-display protocols for software applications. In some embodiments, while capable of being dynamically adaptive based on various contextual considerations such as various application-specific properties, content-specific considerations, and/or user experience quality metrics, such co-display protocols can be locally stored and cached. Co-display protocols can thus provide an efficient means of providing dynamic coordinated display functionalities. In doing so, co-display protocols can address the technological limitations of existing coordinated display solutions by introducing computationally efficient solutions for enabling dynamic coordinated display of diverse software application interfaces and increase the capacity of computing environments with lower levels of hardware capability to perform real-time dynamic coordinated display of diverse software application interfaces.

As another example, various embodiments of the present invention enable a particular software application to manage coordinated display of other software applications with the particular software applications by designating portions of the application interface for the particular software application as an overlay region and display a transparent overlay user interface element over the designated overlay region. Because they can be designated in execution time (e.g., based on co-display protocols), overlay regions provide solutions for dynamic coordinated display of diverse software application interfaces. In addition, because transparent overlay user interface elements imposed on overlay regions can be created with computationally inexpensive operations instead of complex graph operations, overlay regions also provide efficient solutions for dynamic coordinated display of diverse software application interfaces. In doing so, overlay regions can further address the technological limitations of existing coordinated display solutions by introducing computationally efficient solutions for enabling dynamic coordinated display of diverse software application interfaces and increase the capacity of computing environments with lower levels of hardware capability to perform real-time dynamic coordinated display of diverse software application interfaces.

As yet another example, various embodiments of the present invention enable utilizing pre-trained predictive models to generate co-display arrangements in accordance with consumer quality metrics. While they may be computationally expensive to train in the first place, at least once trained the predictive models provide efficient means of considering complex data patterns in making co-display arrangement formation. In other words, by using pre-trained predictive models, various embodiments of the present invention can shift much of the computational complexity of dynamic co-display adjustment operations to training time, e.g., prior to the execution time of a dynamic co-display solution. In doing so, utilizing pre-trained predictive models to generate co-display arrangements in accordance with consumer quality metrics can further address the technological limitations of existing coordinated display solutions by introducing computationally efficient solutions for enabling dynamic coordinated display of diverse software application interfaces and increase the capacity of computing environments with lower levels of hardware capability to perform real-time dynamic coordinated display of diverse software application interfaces.

Definitions

The terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "co-display functionality" refers to any set of one or more computer-implemented operations that enable a software application to perform one or more of the following: (i) enter a co-display mode with one or more software application(s), (ii) transition from a first co-display mode with one or more first software applications to a second co-display mode with one or more second software applications (where the first software applications and the second software applications may be the same set of software applications or a different set of software applications), (iii) terminate a co-display mode with one or more software applications, and (iv) while in a co-display mode with one or more software applications, perform one or more co-display interactions with at least one of the one or more software applications.

For example, a particular co-display functionality may enable a first software application to transition from a first co-display mode in which the first software application is in a marginal display mode (e.g., a thumbnail display mode) and a second software application is in a dominant display mode (e.g., an expanded display mode) to a second co-display mode in which both the first software application and the second software applications are in dominant display modes. As another example, a particular co-display functionality may enable a first software application to transition from a non-active display mode to a co-display mode in which the first software application is in a marginal display mode and a second software application is in a dominant display mode. As yet another example, a particular co-display functionality may enable a first software application to transition from a non-active display mode to a co-display in which both the first software application and a second software application are in dominant display modes. As a further example, a particular co-display functionality may enable a first software application that is in a co-display mode with a second software application to cause the second software application to update its respective application interface.

The term "co-display mode" refers to any display arrangement which allows each of two or more software applications to execute in an active display mode. For example, in one co-display mode, two software applications display their respective application interfaces side-by-side. As another example, in another co-display mode, a first software application displays its respective application interface in a dominant display mode while the second software application displays its respective application interface in a marginal display mode.

The term "active display mode" refers to an execution state for the software application that enables the software application to display at least one application interface for the software application on a display device associated with a computing device on which the software application is executing. For example, a software application may be configured in an active display mode if the software application is configured to display at least one of its application interfaces in a dominant display mode. As another example, a software application may be in an active display mode if the software application is able to display at least one of its application interfaces in a marginal display mode.

The term "non-active display mode" refers to an execution state for the software application that does not enable a software application to display at least one application interface for the software application on a display device associated with a computing device on which the software application is executing. For example, a software application may be in a non-active display mode if the software application is not currently executing (e.g., has not been activated or opened yet). As another example, a software application may be in a non-active display mode if the software application is in a background execution mode.

The term "active display request" refers to an electronic instruction or set of instructions to transition a software application from a non-active display mode to an active display mode. In some embodiments, active display requests are generated by an operating system of a computing device in response to detecting patterns of end-user activity with respect to software applications. For example, an operating system may generate an active display request in response to an end user request to execute a software application. As another example, an operating system may generate an active display request in response to an end user request to transition a software application from a background execution mode to an active display mode. As yet another example, an operating system may generate an active display request in response to an end user request to resize an existing application interface for a software application. As a further example, an operating system may generate an active display request in response to an end user request to transition a software application from a marginal display mode to a dominant display mode.

The term "display space" refers to a virtual space within which a display device can depict visual effects. For example, the display space of a personal computer device may be the virtual space associated with a monitor of the personal computer. As another example, the display space of a smartphone device or tablet device may be the virtual space associated with the screen of the smartphone device or the tablet device. As may be apparent to one of ordinary skill in the art in view of this disclosure, the display space of a personal computer is larger than that of a smartphone device because the display device of the personal computer is larger than that of the smartphone device. These differing display space sizes create complexities when enabling various co-display functionalities as discussed in greater detail below.

The term "display region" refers to a defined portion of a display space. In some embodiments, a display region of a display space may be identified by data that defines a shape and a size of the display region. For example, if a display region is a rectangular-shape region, the particular display region may be defined by data indicating that the shape of the display region is rectangular as well as data indicating coordinate values for each of four points defining the location of the particular rectangular display region. As another example, a particular display region may be defined by a function configured to generate a Boolean output value based on coordinate values for a particular point in the display space, where the Boolean output value indicates whether the particular point is in the particular display region.

The term "overlay region" refers to a display region designated to support a transparent overlay user interface element, as the term is defined below. In some embodiments, an overlay region is designated by a first software application as part of the application interface for the first software application. In some other embodiments, an overlay region is designated a first software application may be configured to occupy a transparent overlay user interface element associated with the first software application.

The term "application interface" refers to one or more user interface elements configured to be displayed by a software application as part of its graphical user interface. In embodiments where a software application supports a plurality of user interface elements, each of the plurality of user interface elements are deemed to be part of a visual unit such that they can be displayed together. For example, an application interface of a particular software application may include a plurality of "windows" associated with the software application. As another example, an application interface of a particular software application (e.g., a smartphone-based and/or tablet-based web browser software application) may include a plurality of "tabs" associated with the software application. As a further example, an application interface of a particular software application (e.g., a smart-phone-based and/or tablet-based navigation software application) may be a thumbnail interface for the particular application.

The term "interface region" refers to a portion of an application interface for a software application. In some embodiments, regionalization of an application interface for a software application into one or more interface regions may be performed based on at least one of a co-display protocol for the software application, end-user experience quality data, end-user activity pattern data (e.g., user click frequency on different portions of a display region), etc.

The term "user interface element" refers to any collection of one or more data items that are configured for rendering using a display device and that form part of a graphical user interface. User interface elements may be defined by semantic rules of a programming language designed to facilitate user interface design. Examples of user interface elements include input-receiving user interface elements (e.g., buttons, text entry fields, date entry fields, checkboxes, sliders, menu bars, links, etc.) and output-displaying user interface elements (e.g., message boxes, modal windows, progress bars, icons, tooltips, images, etc.).

The term "transparent overlay user interface element" for a software application is a user interface element that is associated with the software application but does not depict any particular user perceivable visual features associated with the software application. In some embodiments, a transparent overlay user interface element for a software application is a user interface element that enables the software application to allocate a portion of its application interface for use by other software applications, as discussed in greater detail below. Examples of transparent overlays include user interface elements generated using the overlay-effect class in the Hyper-Text Mark-Up Language (HTML) and the Cascading Style Sheets (CSS) language.

The term "co-display notification" refers to a collection one of or more data items and associated instructions that indicate that a software application has received a request to perform at least one co-display functionality. For example, a co-display notification may indicate that a first software application has received a request to enter an active display mode in a dominant display mode. As another example, a co-display notification may indicate that a first software application has received a request to enter an active display mode in a marginal display mode. As a further example, a co-display notification may indicate that a first software application has received a request to enter an active display mode but has not made a determination about whether to enter the active display mode in a dominant display mode or a marginal display mode. As a further example, a co-display notification may indicate that a first software application seeks to interact with a second software application, where the first software application and the second software application are in a co-display mode.

The term "co-display protocol" refers to a collection of one or more data items and associated instructions that are configured for execution by a first software application and define guidelines for the first software application regarding how to enter co-display modes with other software applications in response to co-display notifications. For example, the co-display protocol for a first software application may indicate that, in response to a co-display notification from any of one or more software applications, the first software application should enable the notifying software to occupy the left half of the application interface for the first software application. As another example, the co-display protocol for a first software application may indicate the following: (i) in response to a co-display notification from a second software application, first software application should enable the second software to transition to a first co-display mode with the first software application, wherein the first co-display mode enables the first software application to be in a dominant display mode and the second software application to be in a marginal display mode; (ii) in response to a co-display notification from a third software application, if the third software application is in an active display mode, first software application should enable the third software application to occupy the left half of the application interface for the first software application; and (iii) in response to a co-display notification from the third software application, if the third software application is in a non-active display mode, first software application should enable the third software to transition a second co-display mode with the first software application, wherein the first co-display mode enables the first software application to be in a dominant display mode and the third software application to be in a marginal display mode.

The term "display update request" refers to a collection of one or more data items and associated instructions generated by a software application that indicate at least one desired modification to a manner in which the software application is being displayed. For example, a display update request may request that a particular application interface of a non-actively-displayed software application be displayed. As another example, a display update request may request that a user interface element of an actively-displayed application interface for the software application be removed. As a further example, a display update request may request that a currently-displayed application interface for a software application be terminated and a new application interface for the software application be displayed.

The term "co-display information" refers to a collection of one or more data items that indicate at least one aspect of the contents of any responses by one or more particular software applications to a co-display notification associated with a first software application. For example, the co-display information may indicate that the no software application is currently in an active display mode (e.g., based on an observation that none of the particular software applications has provided any information in response to the co-display notification). As another example, the co-display information may indicate that one software application is currently in an active display mode and that the one active-display-mode software application has indicated a particular display region as an overlay region. As a further example, the co-display information may indicate that two or more software applications are currently in active display modes and that the two or more active-display-mode software applications have each designated a particular display region as an overlay region. As yet another example, the co-display information may indicate that two or more software applications are currently in active display modes and that the two or more active-display-mode software applications have both designated the same particular display region as an overlay region.

The term "co-display arrangement" refers to a collection of one or more data items that define, for each user interface element in a collection of two or more user interface elements including at least one first user interface element associated with a first software application and at least one second user interface element associated with a second software application, an element display region and an element display size. For example, a particular co-display arrangement may divide the corresponding collection of user interface elements associated with two software applications into two groups: (i) first user interface elements associated with the first software application which will be displayed in a center-right rectangular application interface of the display space and with a fifty percent size reduction relative to original sizes of the first user interface elements; and (ii) second user interface elements associated with the second software application which will be displayed in a center-left rectangular application interface of the display space and with a fifty percent size reduction relative to original sizes of the second user interface elements. As another example, a particular co-display arrangement may divide the corresponding collection of user interface elements associated with two software applications into four groups: (i) a first group of first user interface elements associated with the first software application which will be displayed in a center-right rectangular application interface of the display space and with a twenty percent size reduction relative to original sizes of the first user interface elements; (ii) a second group of the first user interface elements which will not be displayed at all; (iii) a first group of second user interface elements associated with the second software application which will be displayed in a center-left rectangular application interface of the display space and with a twenty percent size reduction relative to original sizes of the second user interface elements; and (iv) a second group of second user interface elements which will not be displayed at all.

As a further example, a particular co-display arrangement may divide the corresponding collection of user interface elements associated with two software applications into six groups: (i) a first group of first user interface elements associated with the first software application which will be displayed in a center-right rectangular application interface of the display space and with a twenty percent size reduction relative to original sizes of the first user interface elements; (ii) a second group of the first user interface elements which will be displayed in a center-right rectangular application interface of the display space and with a sixty percent size reduction relative to original sizes of the first user interface elements; (iii) a third group of the first user interface elements which will not be displayed at all; (iv) a first group of second user interface elements associated with the second software application which will be displayed in a center-left rectangular application interface of the display space and with a twenty percent size reduction relative to original sizes of the second user interface elements; (v) a second group of the second user interface elements which will be displayed in a center-left rectangular application interface of the display space and with a sixty percent size reduction relative to original sizes of the second user interface elements; and (vi) a third group of second user interface elements which will not be displayed at all.

The term "predicted arrangement utility value" refers to any collection of one or more data items that indicate a predicted measure of end-user experience quality if application interfaces defined by a co-display arrangement are displayed. In some embodiments, the predicted arrangement utility value for a co-display arrangement may be determined based on at least one of relevant guidelines in co-display protocols and past data regarding end-user experience quality. In some embodiments, the predicted arrangement utility for a co-display arrangement may be determined using a supervised machine learning model trained using past end-user experience quality observations. In some embodiments, the predicted arrangement utility for a co-display arrangement may be determined using an unsupervised machine learning model defined in accordance with a multi-dimensional co-display arrangement feature space for a group of co-display arrangements, e.g., a clustering model defined in accordance with a multi-dimensional co-display arrangement feature space and/or a K-Nearest-Neighbor model defined in accordance with a multi-dimensional co-display arrangement feature space.

As used herein in relation to a user interface element and a co-display arrangement, the term "predicted element utility value" refers to any collection of one or more data items that indicate a predicted measure of contribution of the user interface element to end-user experience quality if application interfaces defined by the co-display arrangement are displayed. For example, if a co-display arrangement would (once implemented) cause a user interface element to substantially shrink in size, the predicted element utility value for the user interface element given the co-display arrangement may decrease accordingly. As another example, if a co-display arrangement would (once implemented) cause a user interface element to be hidden from the display in its entirety, the predicted element utility value for the user interface element given the co-display arrangement may decrease accordingly and/or be set to zero. As a further example, if a co-display arrangement would (once implemented) cause a user interface element to be moved to a relatively undesirable and/or a relatively non-prominent display region within a display space, the predicted element utility value for the user interface element given the co-display arrangement may decrease accordingly. As a counter-example, if a co-display arrangement would (once implemented) cause a user interface element to be displayed with a prominent size and in a prominent region of a display device, the predicted element utility value of the user interface element given the co-display arrangement may be relatively high.

As used herein in relation to a user interface element and a co-display arrangement, the term "element co-display prominence value" refers to any collection of one or more data items that indicate a predicted noticeability and/or accessibility of the user interface element by an end-user if application interfaces defined by the co-display arrangement are displayed. In some embodiments, element co-display prominence values may be determined based on at least one of relevant guidelines in co-display protocols, past data regarding end-user experience quality, past data regarding end-user activity patterns (e.g., user click frequency on different portions of a display region), etc. In some embodiments, element co-display prominence values may be determined using a supervised machine learning model trained using past end-user experience quality observations. In some embodiments, element co-display prominence values may be determined using an unsupervised machine learning model defined in accordance with a multi-dimensional user interface element feature space for a group of co-display arrangements, e.g., a clustering model defined in accordance with a multi-dimensional user interface element feature space and/or a K-Nearest-Neighbor model defined in accordance with a multi-dimensional user interface element feature space.

As used herein relation to a user interface element and a co-display arrangement, the term "arranged display size" refers to any collection of one or more data items that indicate an exact and/or estimated size of a display region of a display space that will be allocated to the user interface element if application interfaces defined by the co-display arrangement are displayed. For example, the arranged display size for a user interface element may be expressed as an exact and/or estimated ratio of a display region of a display space that is allocated to the user interface element. In some embodiments, to determine arranged display sizes for user interface elements given co-display arrangements, a computer program performs one or more user interface simulations.

As used herein relation to a user interface element and a co-display arrangement, the term "arranged display region" refers to any collection of one or more data items that indicate an exact and/or estimated location of a display region of a display space that will be allocated to the user interface element if application interfaces defined by the co-display arrangement are displayed. For example, the arranged display size for a user interface element may be expressed as exact and/or estimated coordinate values for one or more points (e.g., a central point, four boundary points, etc.) associated with the display region that will be allocated to the user interface element if application interfaces defined by the co-display arrangement are displayed. In some embodiments, to determine arranged display regions for user interface elements given co-display arrangements, a computer program performs one or more user interface simulations.

As used herein in relation to a user interface element, the term "element display significance value" refers to any collection of one or more data items that indicate how significant a prominent display of the user interface element is to user experience quality. For example, a user interface element which relates to contents of a file of user interest may have a higher element display significance value compared to a header-related user interface element. In some embodiments, element display utility values may be determined based on at least one of relevant guidelines in co-display protocols, past data regarding end-user experience quality, past data regarding end-user activity patterns (e.g., user click frequency on different portions of a display region), etc. In some embodiments, element display significance values may be determined using a supervised machine learning model trained using past end-user experience quality observations. In some embodiments, element co-display prominence values may be determined using an unsupervised machine learning model defined in accordance with a multi-dimensional user interface element feature space for a group of user interface elements, e.g., a clustering model defined in accordance with a multi-dimensional user interface element feature space and/or a K-Nearest-Neighbor model defined in accordance with a multi-dimensional user interface element feature space.

The term "predicted region significance value" refers to any collection of one or more data items that indicate how significant a display of relevant content in an interface region is to user experience quality. For example, a centrally-located interface region may have a higher predicted region utility value than a boundary interface region. In some embodiments, predicted region significance values may be determined based on at least one of relevant guidelines in co-display protocols, past data regarding end-user experience quality, past data regarding end-user activity patterns (e.g., user click frequency on different portions of a display region), etc. In some embodiments, predicted region significance values may be determined using a supervised machine learning model trained using past end-user experience quality observations. In some embodiments, predicted region significance values may be determined using an unsupervised machine learning model defined in accordance with a multi-dimensional interface region element feature space for a group of interface region, e.g., a clustering model defined in accordance with a multi-dimensional interface region feature space and/or a K-Nearest-Neighbor model defined in accordance with a multi-dimensional interface region feature space.

The term "interface interaction request" refers to any collection of one or more data items that indicate a pattern of end-user activity in relation to the first software application that may implicate a desired change in at least one application interface of at least one of the one or more second software application. For example, an interface interaction request may indicate an attempt by an end-user to drag a file from a first folder being displayed by a first application interface a second folder being displayed by a second software application. As another example, an interface interaction request may indicate an attempt by an end-user to drag a file outside a first folder being displayed by a first software application. As yet another example, an interface interaction request may indicate an attempt by an end-user to zoom on a first set of user interface elements being displayed by a first software application, where the first set of user interface elements relate to a second of user interface elements being displayed by a second software application. As a further example, an interface interaction request may indicate an attempt by an end-user to enter input data into a first set of user interface elements being displayed by a first software application, where the input data relate to a second set of user interface elements being displayed by a second software application.

As used herein in relation to a first software application that is configured in a co-display mode with one or more second software applications, the term "interface interaction notification" refers to any collection of one or more data items that indicate a request by the first software application that at least one of the one or more second software applications updates at least one of its associated one or more application interfaces in accordance with at least one interface interaction request received by the first software application. For example, in response to obtaining an interface interaction request that indicates an end-user attempt to drag a file from a first folder being displayed by a first application interface a second folder being displayed by a second software application, the first software application may generate an interface interaction notification for the second software application that requests addition of a user interface element corresponding to the file to the user interface associated with the second folder.

As another example, in response to obtaining an interface interaction request that indicates an end-user attempt to drag a file outside a first folder being displayed by a first software application, the first software application may generate an interface interaction notification for each software application in order to notify the recipients of the interface interaction notification about a potential file move operation. As yet another example, in response to obtaining an interface interaction request that indicates an end-user attempt to zoom on a first set of user interface elements being displayed by a first software application that relate to a second of user interface elements being displayed by a second software application, the first software application may generate an interface interaction notification for the second software application that requests zooming on the second software applications. As a further example, in response to obtaining an interface interaction request that indicates an end-user attempt to enter input data into a first set of user interface elements being displayed by a first software application where the input data relate to a second of user interface elements being displayed by a second software application, the first software application may generate an interface interaction notification for the second software application that requests updating of the second set of user interface elements.

The term "interface update determination" refers to a collection of one or more data items that indicate a determination by a software application about how it should update at least one of its application interfaces. For example, in response to generating and transmitting an interface interaction notification indicating that a first user interface element associated with a file has been dragged out of a first user interface for a first software application, the first software application may generate an interface update determination which indicates a desire to remove the first user interface element from the first user interface.

The term "interaction relevance confirmation" refers to a collection of one or more data items that indicate to a first software application that a second software application has confirmed that an interface interaction notification associated with the first software application requires an update to at least one of the interface applications for the second software application. For example, in response to receiving an interface interaction notification related to folder change for a file, a software application may confirm that it is displaying a folder that is an intended destination of the folder change and generate an interaction relevance confirmation that indicates the nature of the noted confirmations. In some embodiments, an interaction relevance confirmation may indicate to a first software application that a second software application has, in addition to confirming that an interface interaction notification associated with the first software application requires an update to at least one of the interface applications for the second software application, performed any mentioned updates.

The term "storage location modification request" refers to a collection of one or more data items that indicate an end-user request to change storage location of one or more stored data items. For example, a storage location modification request may indicate an end-user request to move a file from a first folder to a second folder. As another example, a storage location modification request may indicate an end-user request to move a file from a first storage server to a second storage server. As yet another example, a further example, a storage location modification request may indicate an end-user request to move a file from a first virtual data storage partition to a second virtual data storage partition. As a further example, a storage location modification request may indicate an end-user request to move a file from a first cloud data storage environment to a second cloud data storage environment.

The term "data content modification request" refers to a collection of one or more data items that indicate an end-user request to change at least part of contents of one or more stored data items. For example, a data content modification request may indicate an end-user request to edit a file. As another example, a data content modification request may indicate an end-user request to populate a form.

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Figure 1:
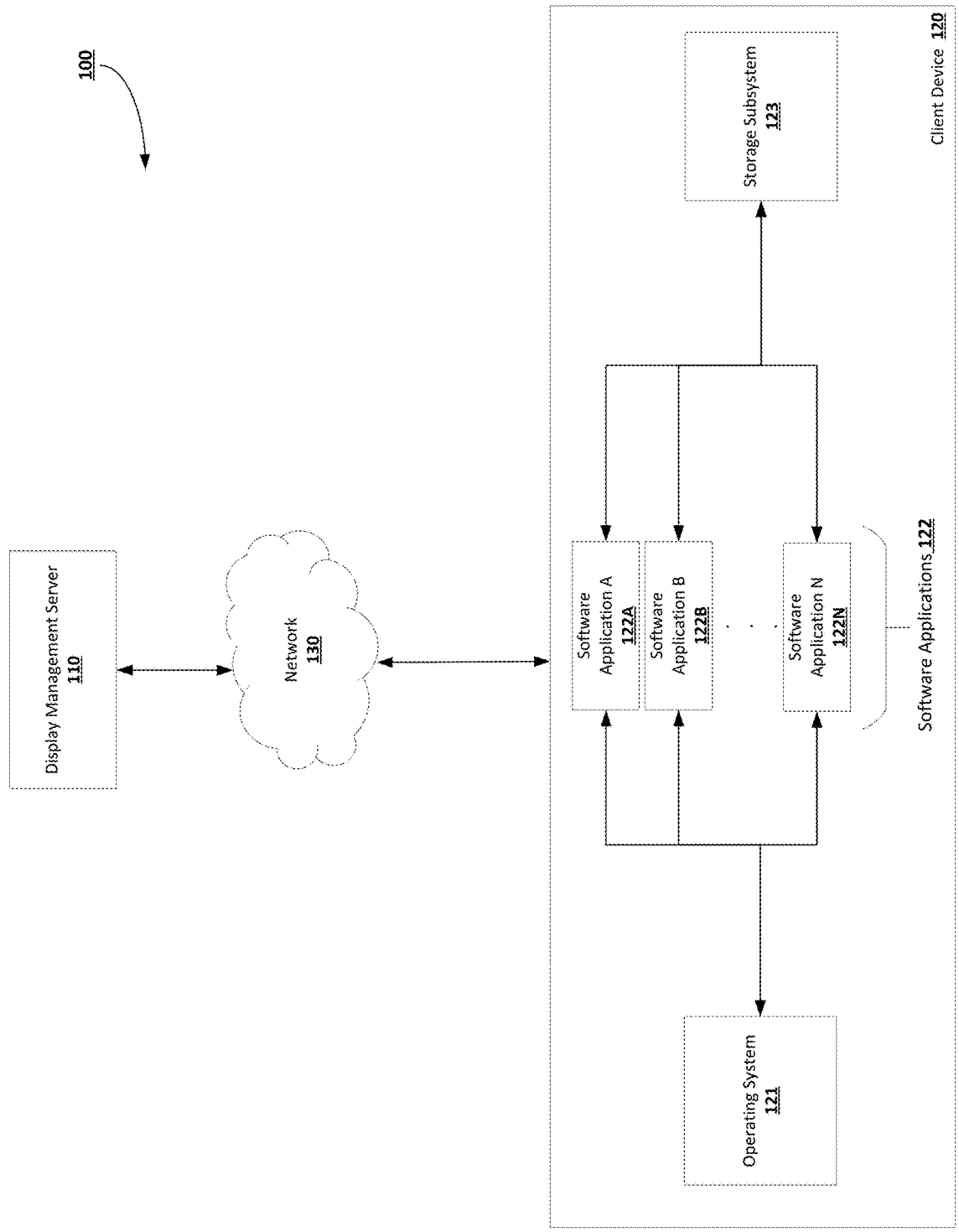
FIG. 1 is a block diagram of an example architecture within which at least some embodiments of the present invention may operate.

FIG. 1 illustrates an example system architecture 100 within which embodiments of the present invention may operate. The architecture 100 includes a display management server 110 configured to interact with a client device 120 over a network 130. The network 130 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the network 130 may include a cellular telephone, an 802.11, 802.16, 802.20, and/or WiMax network. Further, the network 130 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the group-based communication system. In some embodiments, the protocol is a custom protocol of JavaScript Object Notation (JSON) objects sent via a Websocket channel. In some embodiments, the protocol is JSON over RPC, JSON over REST/HTTP, and the like.

The architecture 100 may enable the client device 120 to perform one or more co-display functions between one or more software applications 122, such as software application A 122A, software application B 122B, and software application N 122N. A software application may be an application that is capable of performing at least one of the co-display functionalities discussed in the present disclosure. In some embodiments, one or more organizational entities may seek to enable one or more software applications to perform one or more of the co-display functionalities discussed in the present disclosure in relation to another. For example, an organizational entity may enable two or more of its software applications to perform various co-display functionalities in accordance with the techniques discussed herein rather than the default co-display functionalities provided by various operating systems. In some embodiments, at least one of the co-display functionalities discussed herein may be enabled by an operating system software for a computing device in order to facilitate advanced co-display functionalities for potentially all of the software applications operating on the computing device.

The display management server 110 is configured to provide information related to co-display protocols to the software applications 122. Such information include co-display protocols as well as co-display protocol updates. The software applications may store the received co-display protocol information in the storage subsystem 123 of the client device. The storage subsystem 123 may include one or more storage units, such as multiple distributed storage units that are connected through a computer network. Each storage unit in the storage subsystem 123 may store at least one of one or more data assets and/or one or more data about the computed properties of one or more data assets. Moreover, each storage unit in the storage subsystem 123 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The client device 120 includes an operating system 121. The operating system 121 is a software application configured to enable at least the following functionalities for the client device: (i) enable communications between various software applications stored on the client device 120, such as the one or more software applications 122 stored on the computing device, and (ii) enable various software applications stored on the client device 120, such as the one or more software applications 122 stored on the computing device, to utilize functionalities associated with a display device for the client device 120. Examples of operating systems include Windows operating systems, Linux operating systems, Mac Operating System (OS) operating systems, iPhone Operating System (iOS) operating systems, Android operating systems, etc. Example operating system functionalities configured to enable communications between various software applications include the android.content.BroadcastReceiver class and the android.app.Service class in an Android operating system as well as application groups and local Transmission Control Protocol (TCP) socket functionalities in an iOS operating system.

Exemplary Display Management Server

Figure 2:
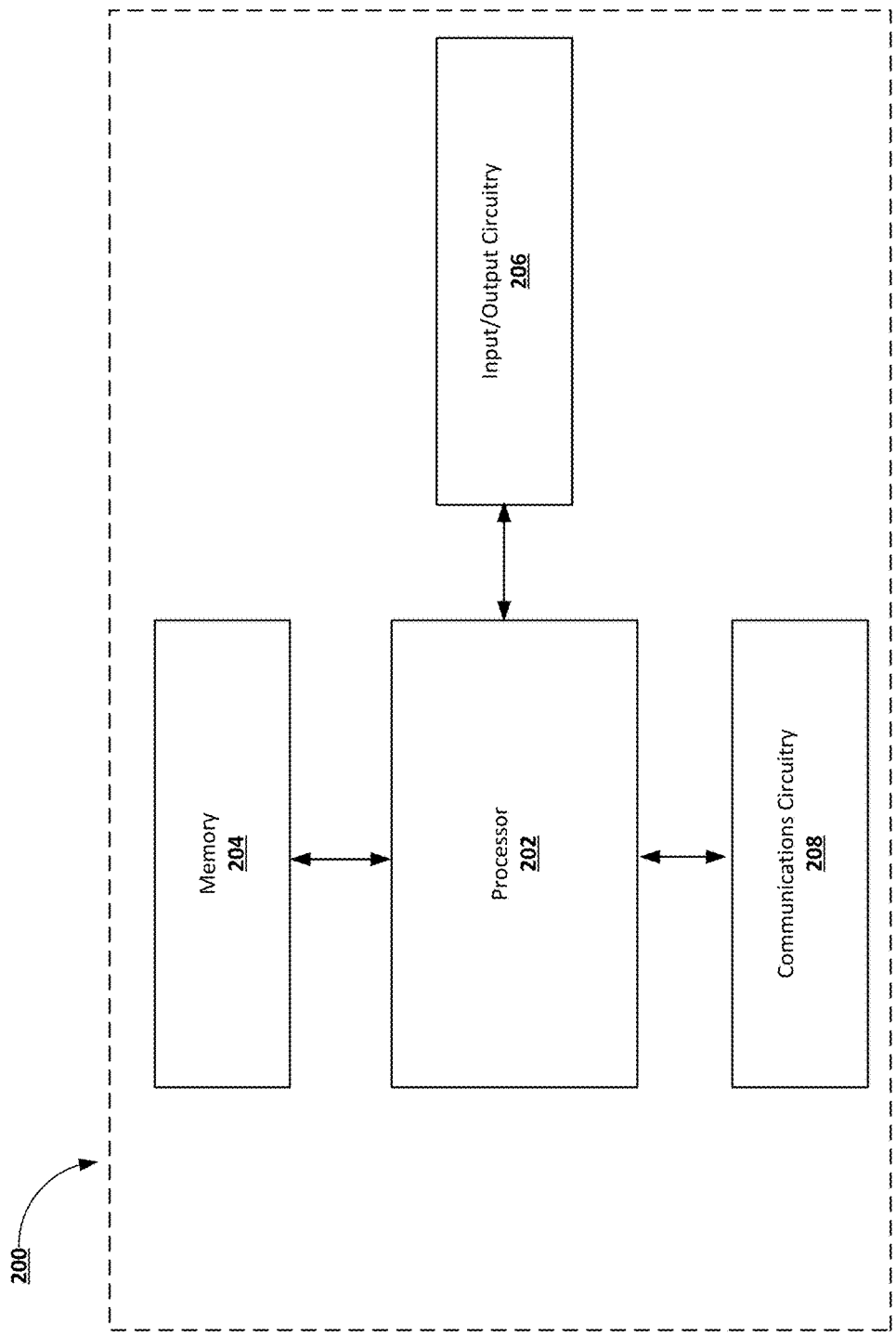
FIG. 2 is a block diagram of an example display management server, in accordance with at least some embodiments of the present invention.

The display management server 110 may be embodied by one or more computing systems, such as apparatus 200 shown in FIG. 2. The apparatus 200 may include processor 202, memory 204, input/output circuitry 206, and communications circuitry 208. The apparatus 200 may be configured to execute the operations described herein. Although these components 202-208 are described with respect to functional limitations, it should be understood that the particular implementations necessarily include the use of particular hardware. It should also be understood that certain of these components 202-208 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware)

stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Exemplary Client Device

Figure 3:
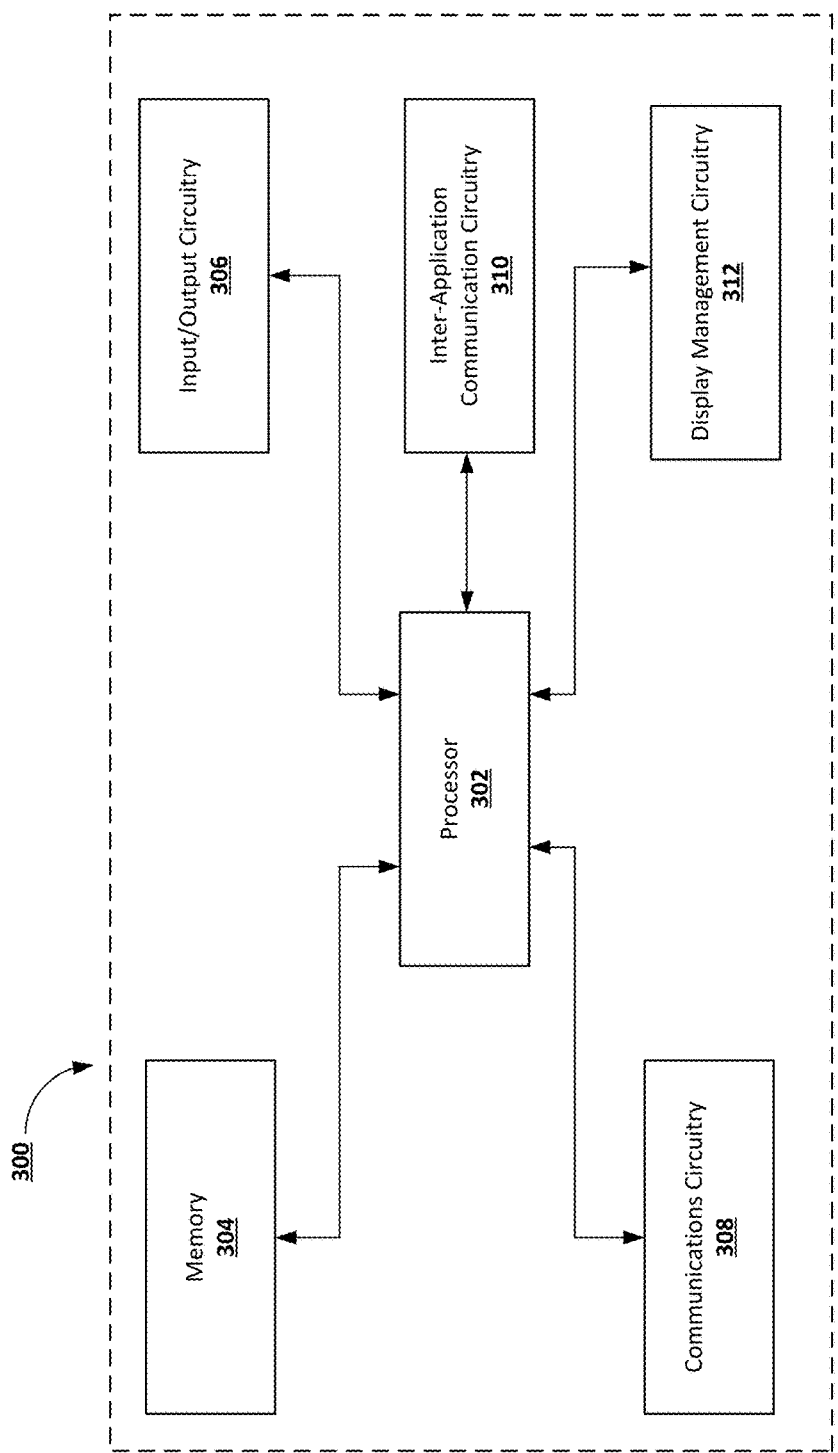
FIG. 3 is a block diagram of an example client device, configured in accordance with at least some embodiments of the present invention.

Referring now to FIG. 3, the client device 120 may be embodied by one or more computing systems, such as apparatus 300 shown in FIG. 3. The apparatus 300 may include processor 302, memory 304, input/output circuitry 306, communications circuitry 308, inter-application communication circuitry 310, and display management circuitry 312. Although these components 302-312 are described with respect to functional limitations, it should be understood that the particular implementations necessarily include the use of particular hardware. It should also be understood that certain of these components 302-312 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a client device, a kiosk, or the like. In some embodiments, the input/output circuitry 306 may also include a keyboard (e.g., also referred to herein as keypad), a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

The inter-application communication circuitry 310 is configured to enable communications between various software applications operating on the apparatus 300. For example, the inter-application communication circuitry 310 may enable communications between various software applications operating on the apparatus 300 using a shared memory inter-application communication mechanism. As another example, the inter-application communication circuitry 310 may enable communications between various software applications operating on the apparatus 300 using a message passing inter-application communication mechanism. As a further example, the inter-application communication circuitry 310 may enable communications between various software applications operating on the apparatus 300 using a combination of a shared memory inter-application communication mechanism and a message passing inter-application communication mechanism.

The display management circuitry 312 is configured to enable various software applications operating on the apparatus 300 to utilize display-related functionalities associated with a display device for the apparatus 300. For example, the display management circuitry 312 may enable utilizing a display region within a display space for the display device. As another example, the display management circuitry 312 may enable displaying transparent overlay user interface elements.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Data Flows and Operations

In general, embodiments of the present invention provide methods, apparatuses, systems, computing devices, and/or the like that are configured to enable coordinated display of software application interfaces. For example, certain embodiments of the present invention provide methods, apparatuses, systems, computing devices, and/or the like that are configured to enable coordinated display of software application interfaces using at least one of transparent overlay user interface elements, co-display arrangements, co-display protocols, and co-displayed interface interaction solutions.

Various embodiments of the present invention improve efficiency and reliability of performing coordinated display functionalities between application interfaces of various software applications. Performing coordinated display of application interfaces for diverse application in a dynamic yet reliable manner while taking into account various application-specific properties, content-specific considerations, and/or user experience quality metrics can be computationally expensive. This is in part because display-enabling programs are generally under intense quality of service expectations. For example, many such programs are expected to enable real-time display of user-requested data with minimal delay in order to enhance user experience quality and avoid creating a user experience quality bottleneck at the output display stage of computer processing.

Accordingly, many existing coordinated display solutions are either non-dynamic (e.g., utilize static coordinated display enablement protocols and display space divisions), inefficient, or both. The technological limitations of existing coordinated display solutions have thus created a frustrating tradeoff between effectiveness of dynamic coordinated display solutions and efficiency of such systems. This tradeoff is especially consequential for various computing environments that lack extensive hardware capabilities for processing (e.g., for video processing), such as various smartphone-related and tablet-related computing environments. Various embodiments of the present invention address the technological limitations of existing coordinated display solutions by introducing computationally efficient solutions for enabling dynamic coordinated display of diverse software application interfaces. In doing so, various embodiments of the present invention increase the capacity of computing environments with lower levels of hardware capability to perform real-time dynamic coordinated display of diverse software application interfaces.

Generating Software Application Interfaces

Figure 4:
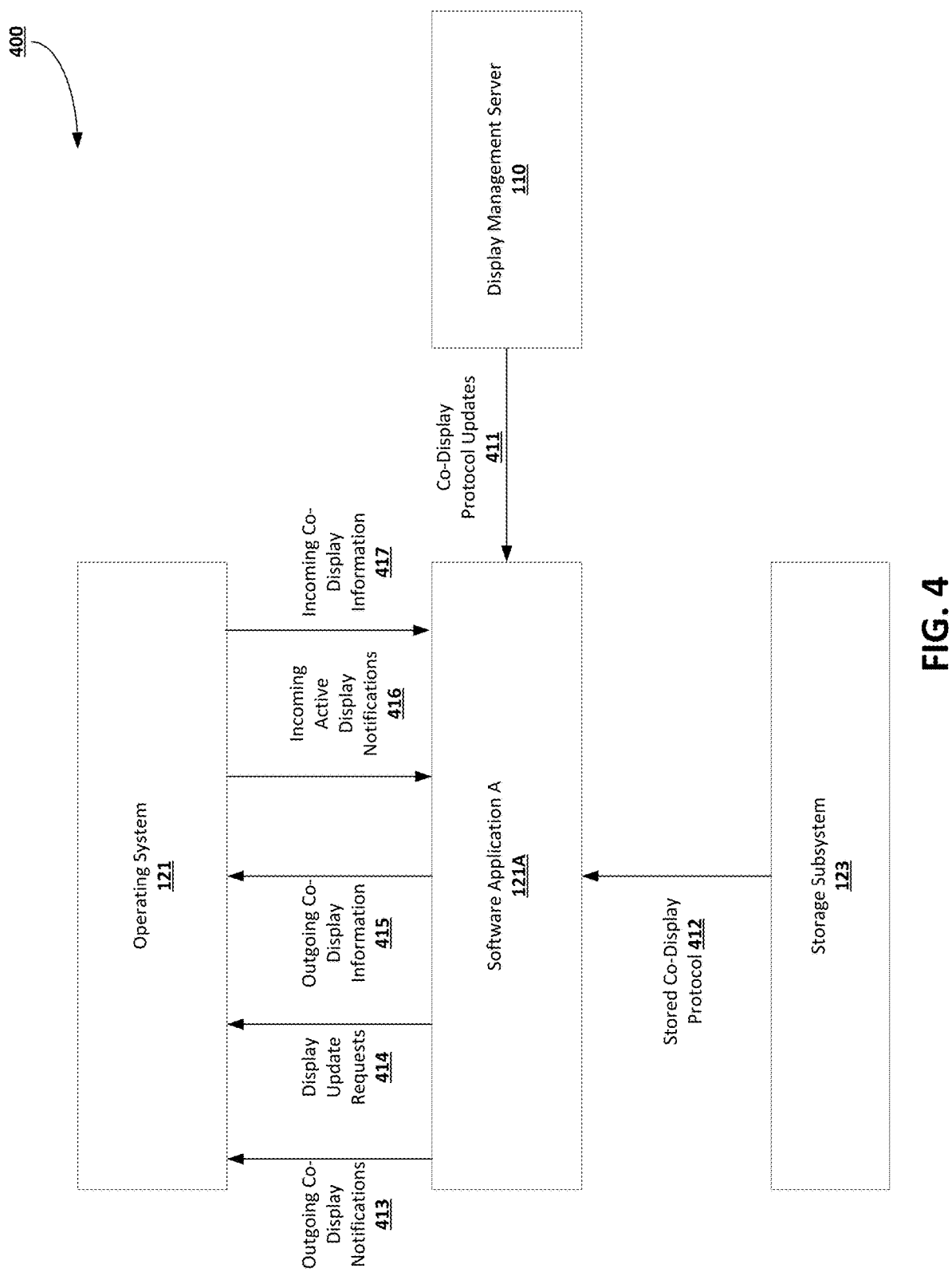
FIG. 4 is a data flow diagram of an example process for enabling a software application to enter a co-display mode with another software application, in accordance with at least some embodiments of the present invention.

FIG. 4 is a data flow diagram of an example process 400 for enabling the example software application A 122A to enter a co-display mode with one or more other software applications (e.g., the example software application B 122B). The process 400 may be different depending on whether the software application A 122A is the software application that requests the co-display mode in the first place or alternatively is the software application that performs co-display-related operations in response to a request for the co-display mode by another software application. In other words, the process 400 may be different depending on whether a co-display notification originates from the software application A 122A or from one or more software applications other than the software application A 122A (i.e., from at least one of the one or more other software applications).

In circumstances where the co-display notification originates from the software application A 122A, the software application may transmit outgoing co-display requests 413 to the operating system 121 and in response receive incoming co-display information 417 associated with at least one of the one or more other software applications. The software application A 122A may then generate display update requests 414 in accordance with the incoming co-display information 417 and transmit the generated display update requests 414 to the operating system 121 in order to utilize display functionalities of the client device 120 (e.g., functionalities of the input/output circuitry 305 and/or the display management circuitry 312 in the exemplary client device 300 of FIG. 3).

In circumstances where the co-display notification originates from one or more notification-originating software applications other than the software application A 122A, the software application A 122A may first receive incoming co-display notifications 416 from the operating system 121. The incoming co-display notifications 416 may be associated with the one or more notification-originating software applications. After receiving the incoming co-display notifications 416, the software application A may utilize a stored co-display protocol 412 for the software application A 122A to generate outgoing co-display information 415 and transmit the outgoing co-display information 415 to the operating system 121, which in turn will transmit the outgoing co-display information 415 to the one or more notification-originating software applications. Moreover, the software application A 122A may generate display update requests 414 in accordance with the outgoing co-display information 415 and transmit the generated display update requests 414 to the operating system 121 in order to utilize display functionalities of the client device 120 (e.g., functionalities of the input/output circuitry 305 and/or the display management circuitry 312 in the exemplary client device 300 of FIG. 3).

As described above, to perform certain the co-display functionalities, the software application A 122A may retrieve and utilize the stored co-display protocol 412 for the software application A 122A. The co-display protocol 412 for the software application A 122A may be stored in and retrieved from the storage subsystem 123. The software application A 122A may further receive software application updates 411 from the display management server 110. In response to receiving software application updates 411, the software application A 122A may update contents of the stored co-display protocol 412 in accordance with the received software application updates 411.

Figure 5:
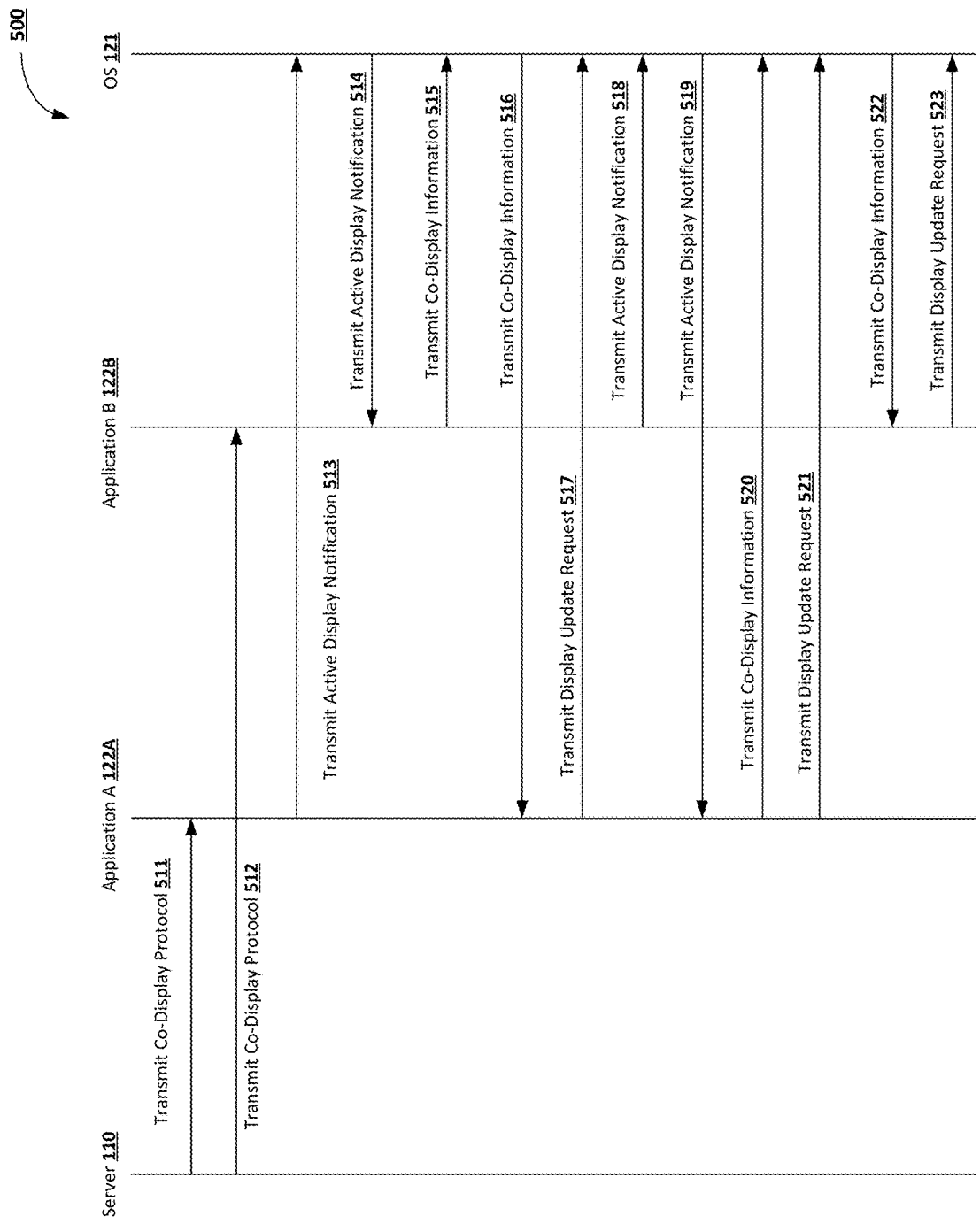
FIG. 5 is a transmission flow diagram of an example process for enabling a software application to enter a co-display mode with another software application, in accordance with at least some embodiments of the present invention.

FIG. 5 is a transmission flow diagram of an example process 500 for enabling the example software application A 122A to enter into a co-display mode with the example software application B 122B. Via the various operations of the example process 500, a system of one or more computers can enable a variety of co-display functionalities between two or more software applications. Although the example process 500 is framed and described with reference to two software applications, a person of ordinary skill in the relevant field will recognize that the process can be implemented using three or more software applications.

The process 500 begins at operations 511 and 512, when the display management server 110 transmits co-display protocols for each of the software application A 122A and the software application B 122B. Although not depicted in FIG. 5, each of the software application A 122A and the software application B 122B may store its respective received co-display protocol in a storage medium, such as in the storage subsystem 123. It is here assumed that, before execution of operation 513, both the software application A 122A and the software application B 122B are in non-active display modes. Using operations 513-517, the software application A 122A seeks to transition from the non-active display mode to an active display mode. Using operations 518-523, which occur subsequent to the operations 513-517, the software application B 122B seeks to transition from the non-active display mode to an active display mode.

At operation 513, the software application A 122A transmits a co-display notification to the operating system 121. In some embodiments, the software application A 122A may obtain a display request associated with an end-user and generate the co-display notification in response to the obtaining the display request. In some embodiments, to obtain the display request, the software application A 122A may detect a pattern of end-user activity configured to indicate an end-user desire to open the software application A 122A, an end-user desire to transition the software application A 122A from a background display mode to an active display mode, an end-user desire to transition the software application A 122A from a marginal display mode to a prominent display mode, an end-user desire to resize at least one application interface associated with the software application A 122A, an end-user desire to transition the software application A 122A from a display mode that is not a co-display mode to a co-display mode, an end-user desire to transition the software application A 122A from a first co-display mode to a second co-display mode, etc.

At operation 514, the operating system 121 transmits (e.g., forwards) the co-display notification received from the software application A 122A to the software application B 122B. In some embodiments, the operating system 121 broadcasts the co-display notification to at least a recipient subgroup of all software applications operating on the client device 120. For example, the operating system 121 may broadcast the co-display notification to each software application operating on the client device 120 which is designated as a software application. The software applications other than the-display software application A 122A in the exemplary implementation of FIG. 5 only include the software application B 122B, but one of ordinary skill in the relevant field will recognize that they may any number of software applications designated as software applications. Although not depicted in FIG. 5, the operating system 121 may make one or more modifications to the co-display notifications received from the software application A 122A before transmitting such co-display notifications to any recipient software applications, e.g., one or more formatting modifications and/or one or more modifications related to adding contextual information such as time information.

At operation 515, in response to receiving the co-display notification from the operating system 121, the software application B 122B transmits co-display information to the operating system 121. In some embodiments, the co-display information transmitted at operation 515 indicate that the software application B 122B is executing in a non-active display mode. Although not depicted in FIG. 5, in some embodiments the software application B 122B will not transmit any information in response to receiving the co-display notification from the operating system 121 when the software application B 122B is in a non-active display mode. In at least some of those embodiments, the operating system 121 will generate co-display information in accordance with the lack of receipt of any feedback from the software application B 122B within a threshold time period, e.g., by inferring that the lack of receipt indicates that the software application B 122B is currently executing in a non-active display mode.

At operation 516, the operating system 121 transmits (e.g., forwards) the co-display information received from the software application B 122B to the software application A 122A. In some embodiments, the co-display information transmitted at operation 516 indicate that each software application operating on the client device 120 (which here only includes the software application B 122B) is executing in a non-active display mode at the time of transmission of the co-display information. Although not depicted in FIG. 5, the operating system 121 may make one or more modifications to the co-display information received from the software application B 122B before transmitting such co-display information to any recipient software applications, e.g., one or more formatting modifications and/or one or more modifications related to aggregation of one or more received co-display information data objects each received from a different software application.

At operation 517, the software application A 122A transmits a display update request to the operating system 121. In some embodiments, in response to receiving from the co-display information indicating that each software application is executing in a non-active display mode, the software application A 122A makes a determination to transition to an active display mode, e.g., an active display mode which is not a co-display mode and/or is a default co-display mode defined based on system configuration data associated with the client device 120. For example, the software application A 122A may decide to transition to an active display mode which is a dominant display mode. As another example, the software application A 122A may decide to transition to an active display mode which is a marginal display mode. In some embodiments, the software application may select its desired active display mode based on system configuration data associated with the client device 120 and/or based on its co-display protocol.

The software application A 122A may then generate the display update request as a request to transition to a desired active display mode and transmit the generated display update request to the operating system 121. Although not depicted in FIG. 5, the operating system 121 may subsequently update the display space in accordance with the display update request received at operation 517. Thus, after successful execution of operation 517 and before the beginning of the execution of operation 518, the software application A 122A may be in an active display mode while each other software application (which here only includes the software application B 122B) is executing in a non-active display mode.

At operation 518, the software application B 122B transmits a co-display notification to the operating system 121. In some embodiments, the software application B 122B may obtain a display request associated with an end-user and generate the co-display notification in response to the obtaining the display request. In some embodiments, to obtain the display request, the software application B 122B may detect a pattern of end-user activity configured to indicate an end-user desire to open the software application B 122B, an end-user desire to transition the software application B 122B from a background display mode to an active display mode, an end-user desire to transition the software application B 122B from a marginal display mode to a prominent display mode, an end-user desire to resize at least one application interface associated with the software application B 122B, an end-user desire to transition the software application B 122B from a display mode that is not a co-display mode to a co-display mode, an end-user desire to transition the software application B 122B from a first co-display mode to a second co-display mode, etc.

At operation 519, the operating system 121 transmits (e.g., forwards) the co-display notification received from the software application B 122B to the software application A 122A. In some embodiments, the operating system 121 broadcasts the co-display notification to at least a recipient subgroup of all software applications operating on the client device 120. For example, the operating system 121 may broadcast the co-display notification to each software application operating on the client device 120 which is designated as a software application. The software applications other than the-display software application B 122B in the exemplary implementation of FIG. 5 only include the software application A 122A, but one of ordinary skill in the relevant field will recognize that they may any number of software applications designated as software applications. Although not depicted in FIG. 5, the operating system 121 may make one or more modifications to the co-display notifications received from the software application B 122B before transmitting such co-display notifications to any recipient software applications, e.g., one or more formatting modifications and/or one or more modifications related to adding contextual information such as time information.

At operation 520, in response to receiving the co-display notification from the operating system 121, the software application A 122A transmits co-display information to the operating system 121. In some embodiments, the co-display information transmitted at operation 520 indicate that the software application A 122A is executing in an active display mode. In some embodiments, because the software application A 122A is executing in an active display mode, the co-display information generated by the software application A 122A indicate an overlay region of an application interface associated with the software application A 122A. The overlay region may be generated by the software application A 122A based on the co-display protocol associated with the software application A 122A.

At operation 521, the software application A 122A transmits a display update request to the operating system 121. The display update request transmitted by the software application A 122A at operation 521 may be configured to cause the software application A 122A to be in a co-display mode with the software application B 122B. For example, the display update request may be configured to cause the software application A 122A to display a transparent overlay user interface element over an overlay region identified in the co-display information transmitted at operation 520. Although not depicted in FIG. 5, the operating system 121 may subsequently update the display space in accordance with the display update request received at operation 521. Thus, after successful execution of operation 521 and before the beginning of the execution of operation 522, the application interface for the software application A 122A may be adjusted in accordance with the display update request transmitted at operation 521, e.g., may include a transparent overlay user interface element over an overlay region identified in the co-display information transmitted at operation 520.

At operation 522, the operating system 121 transmits (e.g., forwards) the co-display information received from the software application A 122A to the software application B 122B. In some embodiments, the co-display information transmitted at operation 521 indicate that the software application A 122A operating on the client device 120 is executing in an active display mode at the time of transmission of the co-display information and/or may identify an overlay region of the application interface for the software application A 122A. Although not depicted in FIG. 5, the operating system 121 may make one or more modifications to the co-display information received from the software application A 122A before transmitting such co-display information to any recipient software applications, e.g., one or more formatting modifications and/or one or more modifications related to aggregation of one or more received co-display information data objects each received from a different software application.

At operation 523, the software application B 122B transmits a display update request to the operating system 121. In some embodiments, in response to receiving from the co-display information identifying an overlay region of the application interface for the software application A 122A, the software application B 122B makes a determination to display an application interface for the first software application 121A in the overlay region. In some embodiments, in response to receiving from the co-display information indicating that each the software application A 121A is executing in an active display mode, the software application B 122B makes a determination to transition to a co-display mode display mode. For example, the software application B 122B may decide to transition to a co-display display mode which is a dominant display mod. As another example, the software application B 122B may decide to transition to an active display mode which is a marginal display mode. In some embodiments, the software application may select its desired active display mode based on system configuration data associated with the client device 120, based on its co-display protocol, and/or based on co-display instructions in the co-display information received at operation 521.

The software application B 122B may then generate the display update request as a request to transition to a desired co-display display mode and transmit the generated display update request to the operating system 121. Although not depicted in FIG. 5, the operating system 121 may subsequently update the display space in accordance with the display update request received in operation 523. Thus, after successful execution of operation 523, the software application A 122A and the software application B 122B may be in a co-display mode with each other.

Figure 6:
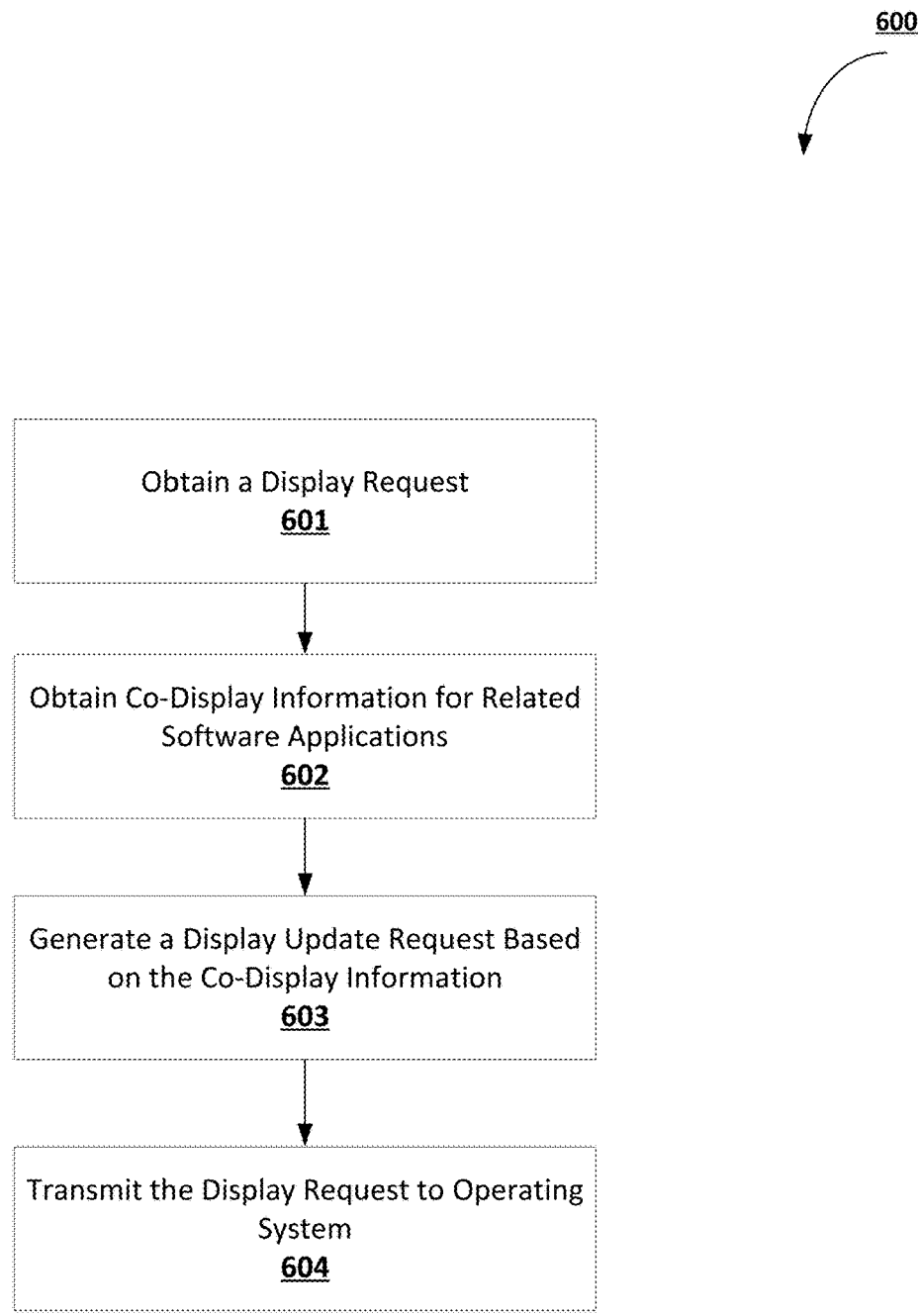
FIG. 6 is a flowchart diagram of an example process for performing a transition of a software application from a non-active display mode to a co-display mode, in accordance with at least some embodiments of the present invention.

FIG. 6 is a flowchart diagram of an example process 600 for performing a transition of a software application from a non-active display mode to a co-display mode. The process 600 will be described with reference to the software application B 122B, which is presumed to be in a non-active display mode. However, a person of ordinary skill in the relevant field will recognize that the process 600 may be performed by any software application that is in a non-active display mode and/or any software application that is currently in a co-display mode and seeks to transition to a second co-display mode in accordance with a received display request associated with the software application.

The process 600 begins at operation 601 when the software application B 122B obtains a display request. The software application B 122B may obtain the display request from the operating system 121. In some embodiments, to obtain the display request, the operating system and/or the software application B 122B may detect a pattern of end-user activity configured to indicate an end-user desire to open the software application B 122B, an end-user desire to transition the software application B 122B from a background display mode to an active display mode, an end-user desire to transition the software application B 122B from a marginal display mode to a prominent display mode, an end-user desire to resize at least one application interface associated with the software application A 122A, an end-user desire to transition the software application B 122B from a display mode that is not a co-display mode to a co-display mode, an end-user desire to transition the software application B 122B from a first co-display mode to a second co-display mode, etc.

At operation 602, the software application B 122B obtains co-display information for one or more related software applications associated with the software application B 122B. In some embodiments, the one or more related software applications associated with the software application B 122B include each software application executing on the client device 120 other than the software application B 122B. In some embodiments, the one or more related software applications associated with the software application B 122B include each software application executing on the client device 120 as the software application B 122B which is in a software application grouping with the software application B 122B but is not the software application B 122B itself. In some embodiments, a software application grouping includes one or more software applications configured to enable co-display functions with respect to each other. For example, a navigation software application and a music software application may be in a first software application grouping, an Integrated Development Environment (IDE) software application and a code repository software application may be in a second software application grouping, a mail software application and a calendar software application may be in a third software application grouping, etc.

At operation 603, the software application B 122B generates a display update request based on the co-display information obtained in operation 602. In some embodiments, the display update request is a request to generate one or more application interfaces for the software application B 122B based on any guidelines in the obtained co-display information. In some embodiments, the display update request is at least in part generated based on a co-display protocol associated with the software application B 122B. In some embodiments, the display update request is generated based on an overlay region identified in the co-display information obtained in operation 602.

Figure 7:
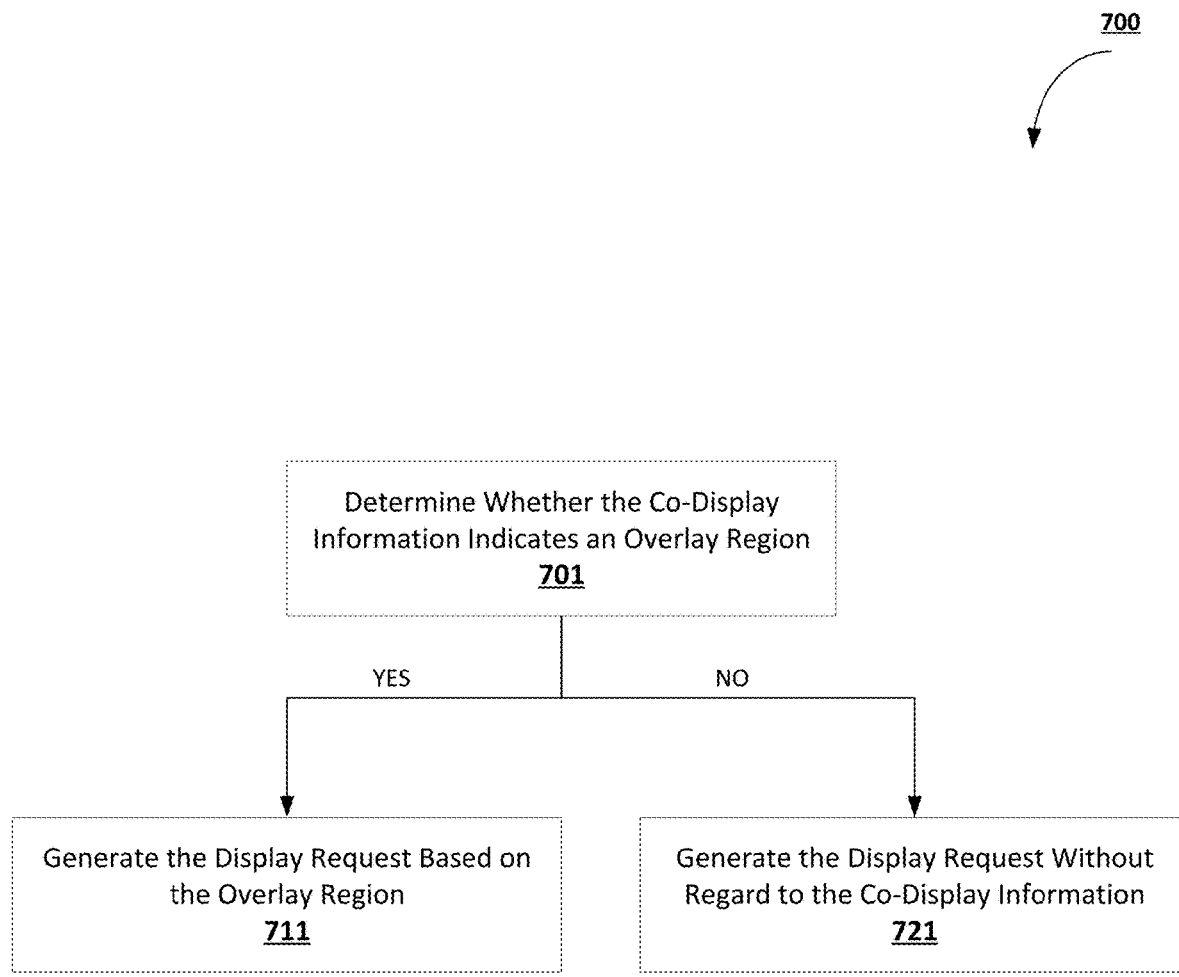
FIG. 7 is a flowchart diagram of an example process for generating a display update request by a software application in a non-active display mode in order to facilitate transmission of the software application to a co-display mode, in accordance with at least some embodiments of the present invention.

In some embodiments, operation 603 may be performed in accordance with the process 700 depicted in FIG. 7, which is an example process for generating a display update request by a software application in a non-active display mode in order to facilitate transmission of the software application to a co-display mode. The process 700 begins at operation 701 when the software application B 122B determines whether the co-display information indicates an overlay region. In response to determining that the co-display information indicates an overlay region, the software application B 122B proceeds to operation 711, where the software application B 122B generates a display request based on the overlay region, e.g., generates a request for permission to display an application interface for the software application B 122B in the overlay region. However, in response to determining that the co-display information does not indicate an overlay region, the software application B 122B proceeds to operation 721, where the software application B 122B generates a display request without regard to the received co-display information, e.g., generates a request for permission to display in accordance with predefined and/or conventional techniques and settings for application display in the client device 120, as optionally defined by one or more display-related procedures of the software application B 122B.

Returning to FIG. 6, at operation 604, the software application B 122B transmits the generated display request to the operating system 121 in order to cause the client device 120 to update the display region for the client device 120 in accordance with the generated display request. Although the exemplary implementation of FIG. 6 merely discusses transmission of a display-related request to the operating system 121 as a method for causing the client device 120 to update the display region for the client device 120 in accordance with the generated display request, a person of ordinary skill in the relevant field will recognize that any technique for causing the client device 120 to update the display region for the client device 120 in accordance with the generated display request may be suitable.

Figure 8:
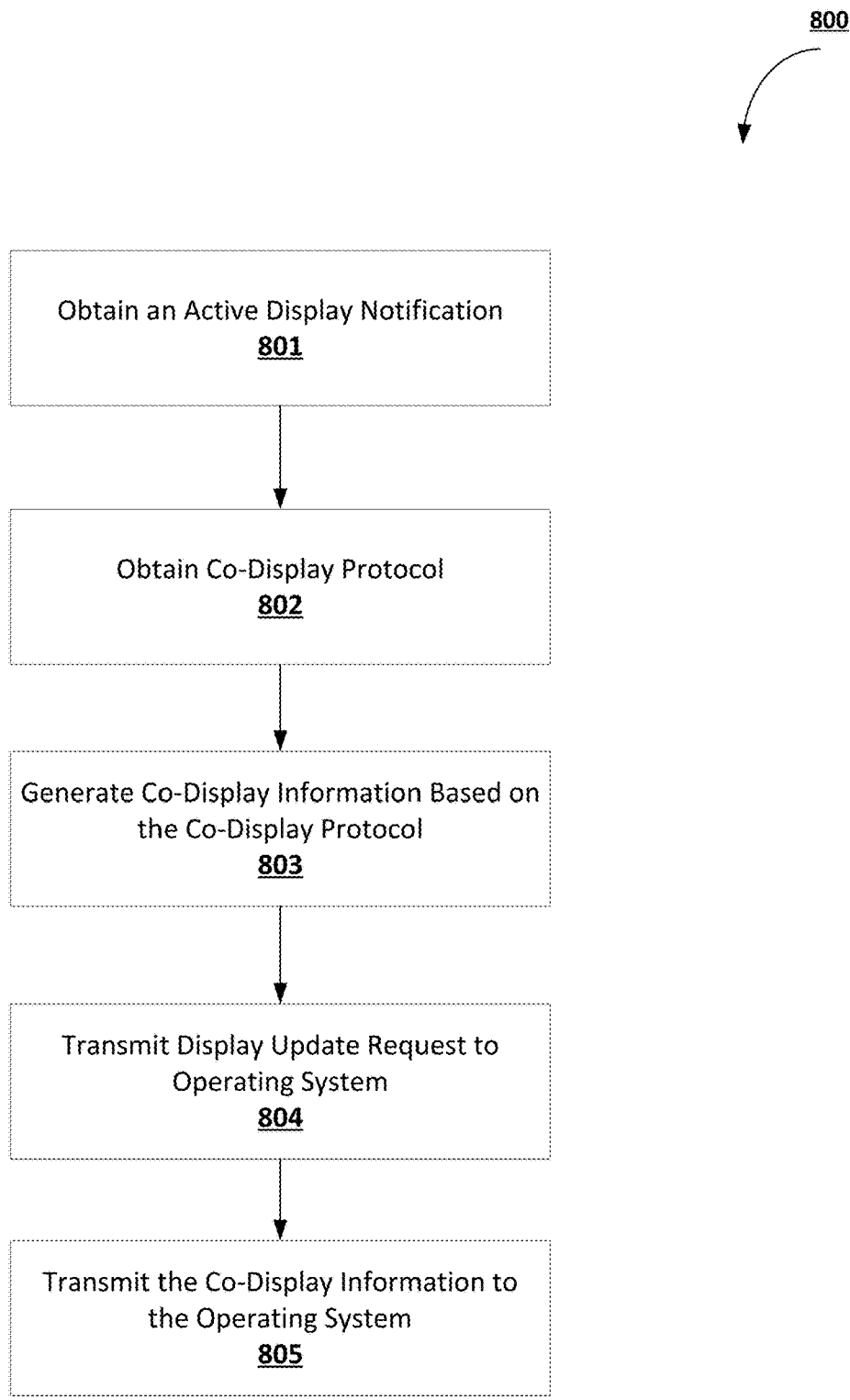
FIG. 8 is a flowchart diagram of an example process for performing a transition of a software application with an active display mode to a co-display mode, in accordance with at least some embodiments of the present invention.

FIG. 8 is a flowchart diagram of an example process 800 for performing a transition of a software application with an active display mode to a co-display mode. The process 800 will be described with reference to the software application A 122A, which is presumed to be in an active display mode which is not a co-display mode. However, a person of ordinary skill in the relevant field will recognize that the process 800 may be performed by any software application that is in an active display mode, including any software application that is in a first co-display mode and seeks to transition to a second co-display mode in accordance with a received co-display notification associated with a different software application.

The process 800 begins at operation 801 when the software application A 122A obtains a co-display notification associated with a co-display-requesting software application. For example, the co-display notification obtained at operation 801 may be a co-display notification generated by the software application B 122B in accordance with the operation 601 of the process 600 depicted in FIG. 6, as discussed above. Although example process 800 is described herein with reference to one co-display notification from one co-display-requesting software application, a person of ordinary skill in the relevant field will recognize that the software application A 122A may obtain multiple co-display notifications from each of multiple co-display-requesting software applications. In some embodiments, the first software application is executing in an active display mode, the second software application is executing in a non-active display mode, and the co-display notification indicates an active display request associated with the second software application, wherein the active display request is configured to cause the second software application to transition from the active display mode to the non-active display mode.

At operation 802, the software application A 122A obtains a co-display protocol. The co-display protocol may define procedures for performing co-display functionalities with respect to a range of software applications in accordance with one or more of the identifies of requesting software applications, displayable contents of requesting software applications, displayed and/or displayable contents of the software application A 122A, display space size, application interface size, various operational capacity metrics of the client device 120 (e.g., operational metrics related to at least one of the processing capability of the client device 120, the video processing capabilities of the client device 120, the currently remaining battery power of the client device 120, etc.), past end-user experience quality metrics, past end-user experience quality preferences, past end-user activity patterns, etc. In some embodiments, the co-display protocol of the software application A 122A may prescribe detecting overlay regions based on measures of predicted arrangement utility value for co-display arrangements and/or predicted region significance values for interface regions, as further described below with reference to operation 803.

At operation 803, the software application A 122A generates co-display information for the co-display notification based on the co-display notification and/or the co-display protocol for the software application A 122A. In some embodiments, generating the co-display information includes generating one or more guidelines for generating at least one application interface associated with the co-display-requesting software application. In some embodiments, generating the co-display information includes determining an overlay region associated with the display space of the client device 120. Example techniques for determining overlay regions are described below.

In some embodiments, determining the overlay region includes identifying one or more interface regions of a first application interface associated with the software application A 122A; for each interface region of the one or more interface regions, selecting a predicted region significance value; and selecting the overlay region based on each predicted region utility value for an interface region of the one or more interface regions. In some embodiments, selecting the overlay region based on each predicted region utility value for an interface region of the one or more interface regions includes selecting the interface region having the highest predicted region utility value as the overlay region.

Figure 9:
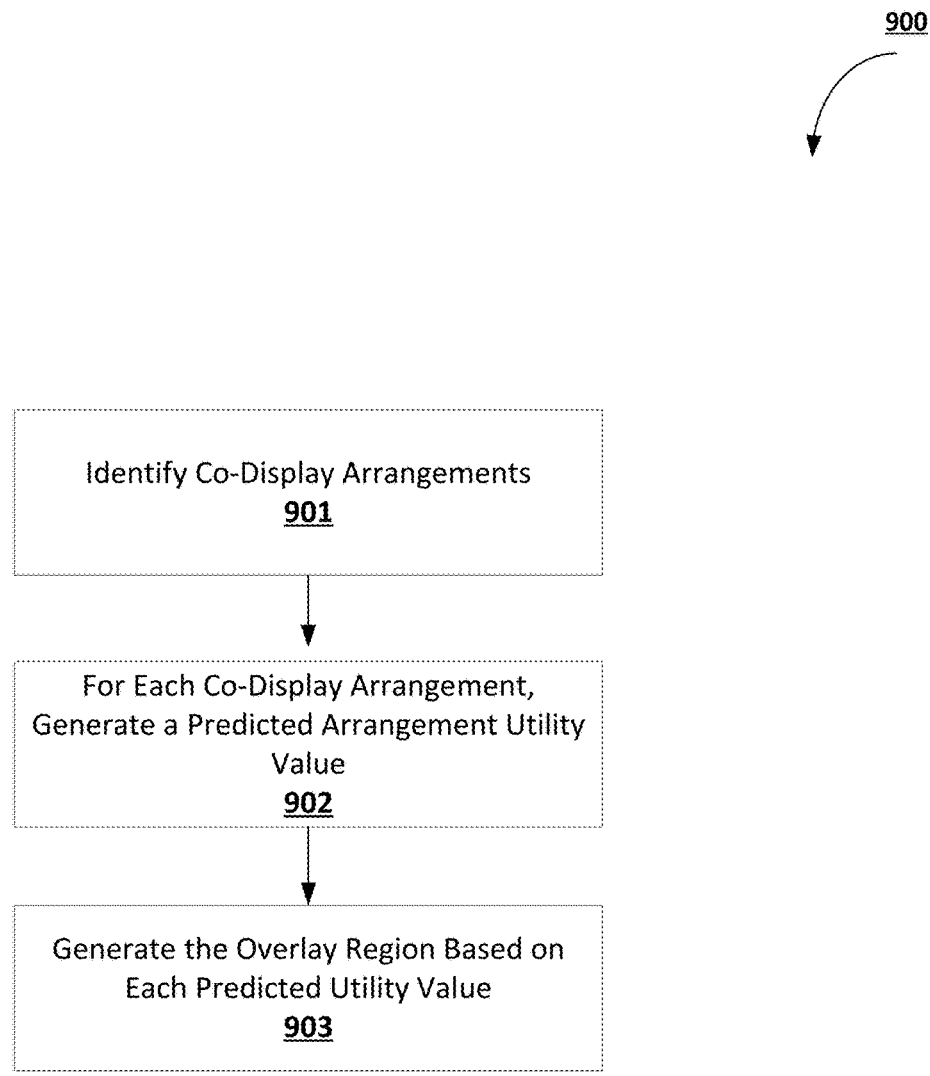
FIG. 9 is a flowchart diagram of an example process for determining an overlay region in an application interface based on predicted arrangement utility values for co-display arrangements, in accordance with at least some embodiments of the present invention.

In some embodiments, determining the overlay region may be performed based on predicted arrangement utility values for co-display arrangements. FIG. 9 is a flowchart diagram of an example process 900 for determining an overlay region in an application interface based on predicted arrangement utility values for co-display arrangements. Like the process 800, the process 900 will be described with reference to the software application A 122A, which is presumed to be in an active display mode which is not a co-display mode. However, a person of ordinary skill in the relevant field will recognize that the process 800 may be performed by any software application that is in an active display mode, including any software application that is in a first co-display mode and seeks to transition to a second co-display mode in accordance with a received co-display notification associated with a different software application.

The process 900 begins at operation 901 when the software application A 122A identifies two or more co-display arrangements each associated with a respective overlay region (where the overlay region may include one or multiple segments of an application interface for the software application A 122A). In some embodiments, the software application A 122A selects up to N co-display arrangements each having sufficiently different features based on a multi-dimensional co-display arrangement feature space associated with a range of co-display arrangements for the software application A 122A, where N may be a fixed, variable, and/or trained parameter of the software application A 122A. In some embodiments, the software application A 122A selects up to M co-display arrangements deemed to be most highly desirable based on past end-user experience data, where M may be a fixed, variable, and/or trained parameter of the software application A 122A.

Figure 10:
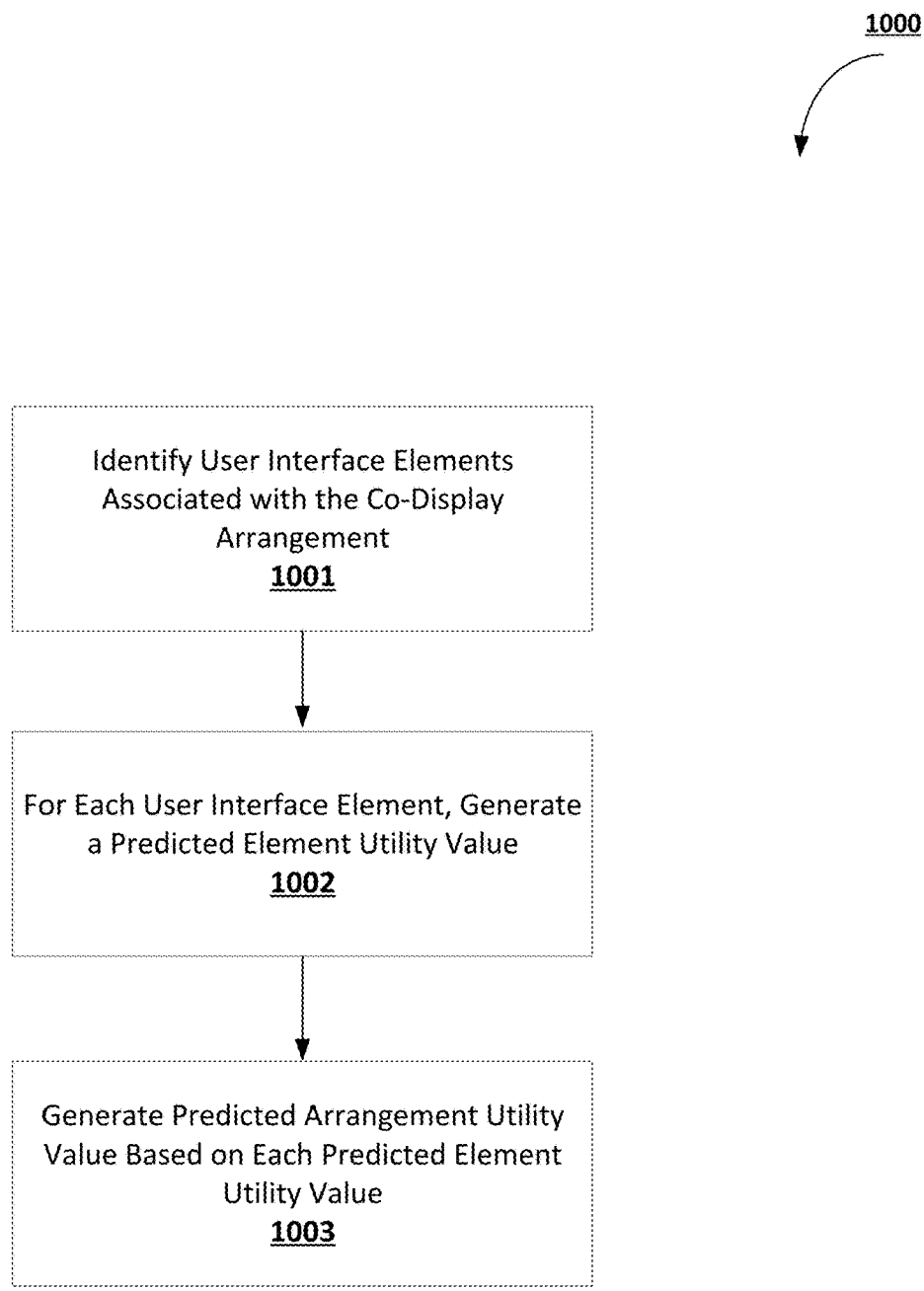
FIG. 10 is a flowchart diagram of an example process for generating a predicted arrangement utility value for a particular co-display arrangement, in accordance with at least some embodiments of the present invention.

At operation 902, the software application A 122A generates a predicted arrangement utility value for each co-display arrangement identified in operation 901. In some embodiments, to generate generates a predicted arrangement utility value for a particular co-display arrangement, the software application A 122A performs the operations of the example process 1000 depicted in FIG. 10. As depicted in FIG. 10, the process 1000 begins at operation 1001 when the software application A 122A identifies one or more user interface elements associated with the particular co-display arrangement. At operation 1002, the software application A 122A generates a predicted element utility value for each user interface element given the particular co-display arrangement. At operation 1003, the software application A 122A generates a predicted arrangement utility value for the particular co-display arrangement based on each predicted element utility value for a user interface element of the one or more user interface elements for the particular co-display arrangement identified in operation 1001. In some embodiments, the software application A 122A combines and/or averages each predicted element utility value generated in operation 1002 to generate a predicted arrangement utility value for the particular co-display arrangement. In some embodiments, the software application A 122A selects a candidate overlay region designated by a co-display arrangement having the highest predicted element utility value as the overlay region.

Figure 11:
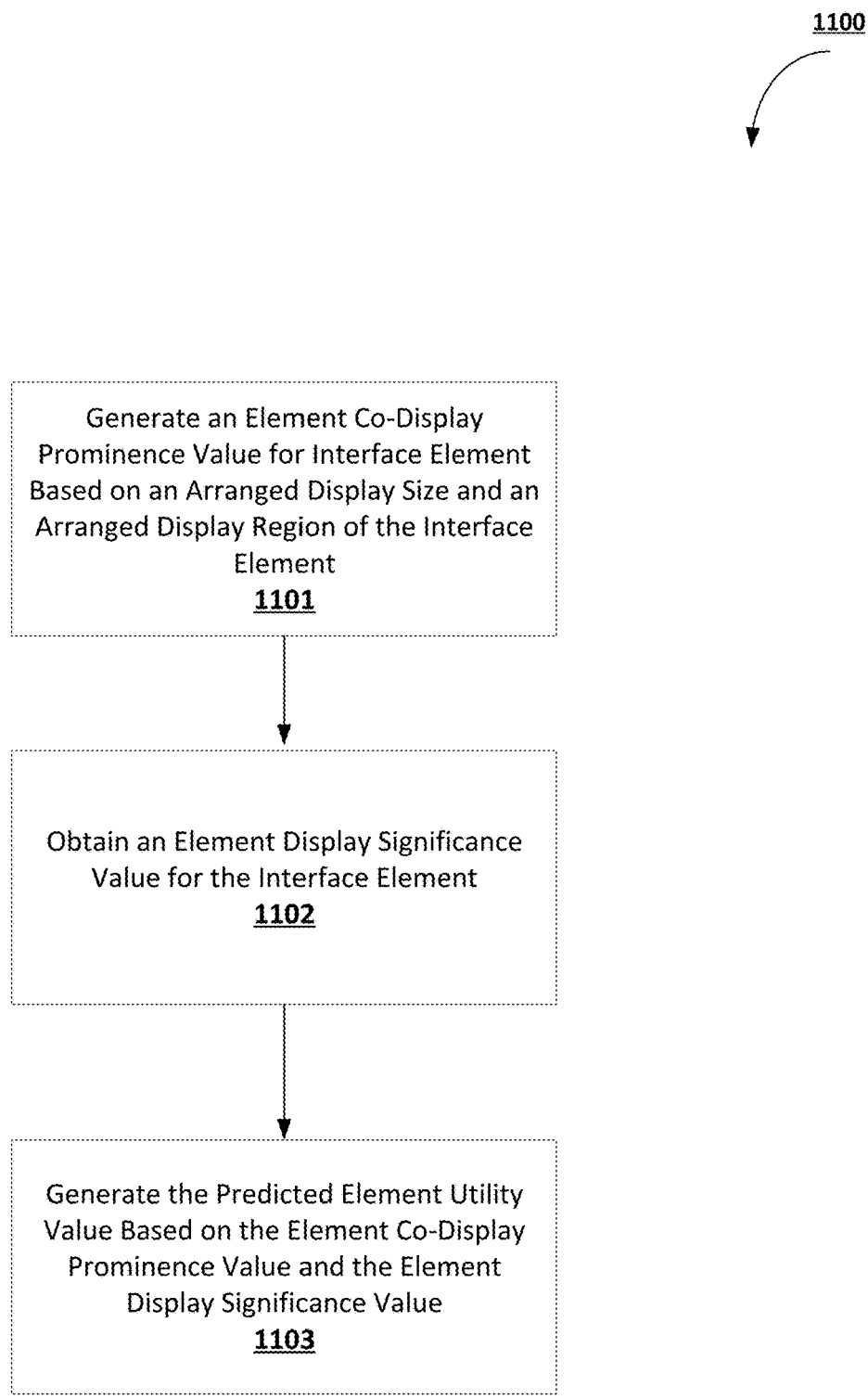
FIG. 11 is a flowchart diagram of an example process for generating a predicted element utility value for a particular user interface element given a particular co-display arrangement, in accordance with at least some embodiments of the present invention.

In some embodiments, to generate a predicted element utility value for a particular user interface element given a particular co-display arrangement in operation 1002, the software application A 122A performs the operations of the example process 1100 depicted in FIG. 11. As depicted in FIG. 11, the process 1100 begins at operation 1101 when the software application A 122A generates an element co-display prominence value for the particular user interface element given the particular co-display arrangement based on an arranged display size of the particular interface element given the co-display arrangement and an arranged display region of the particular user interface element given the co-display arrangement. At operation 1102, the software application A 122A obtains an element display significance value for the user interface element. At operation 1103, the software application A 122A generates the predicted element utility value for the particular user interface element given the particular display arrangement based on the element co-display prominence value and the element display significance value. In some embodiments, the software application A 122A multiplies and/or combines the element co-display prominence value and the element display significance value in order to generate the predicted element utility value for the particular user interface element given the particular display arrangement.

Returning to FIG. 8, at operation 804, the software application A 122A transmits a display update request to the operating system 121. In some embodiments, the software application A 122A generates the display update request based on any expected changes to any application interfaces for the software application A 122A in accordance with the co-display information generated in operation 803. In some embodiments, the display update request is a request for display of a transparent overlay user interface element over an overlay region identified in the co-display information generated in operation 803. In some embodiments, the software application A 122A transmits the display update request in order to cause the client device 120 to update display of the application interfaces for the software application A 122A in accordance with the display update request. Although the exemplary implementation of FIG. 8 merely discusses transmission of a display-related request to the operating system 121 as a method for causing the client device 120 to update the display region for the client device 120 in accordance with the generated display request, a person of ordinary skill in the relevant field will recognize that any technique for causing the client device 120 to update the display region for the client device 120 in accordance with the generated display request may be suitable.

At operation 805, the software application A 122A transmits the co-display information generated in operation 803 to the operating system 121 for transmission to the co-display-requesting software application. Although the exemplary implementation of FIG. 8 merely discusses transmission of the co-display information to the operating system 121 as a method for causing the client device 120 to transmit co-display information to the second software application, a person of ordinary skill in the relevant field will recognize that any technique for causing the client device 120 to transmit co-display information to the second software application may be suitable. In some embodiments, the co-display information transmitted to the co-display-requesting software application identify the overlay region (e.g., identify one or more of a location and a size of the overlay region).

Using techniques described in relation to FIGS. 4-11, a computing device (e.g., the client device 120) can generate co-display mode between two or more software applications. An operational example of performing a transition of a software application (i.e., the software application B 122B) from a non-active display mode into a co-display mode with another software application (i.e., the software application B 122B) is provided using the exemplary display interfaces 1200, 1230, and 1250, which are depicted in FIGS. 12A-12C respectively. The display interfaces 1200, 1230, and 1250 all depict a first user interface element 1202A for the software application A 122A and a second user interface element 1202B for the software application B 122B in a footer region 1202 of the display interfaces 1200, 1230, and 1250. Moreover, display interfaces 1200, 1230, and 1250 all depict a first application interface 1201 for the software application A 122A as well as a cursor user interface element 1203.

The transition from the display interface 1200 of FIG. 12A to the display interface 1250 of FIG. 12C is caused by the selection of the second user interface element 1202B by the cursor user interface element 1203, as depicted in the display interface 1200 of FIG. 12A. Before the selection of the second user interface element 1202B by the cursor user interface element 1203, the software application A 122A is in an active display mode which is not a co-display mode, while the software application B 122B is in a non-active display mode. The selection of the second user interface element 1202B by the cursor user interface element 1203 in turn causes a chain of events that ultimately leads to a transition of both of the software application A 122A and the software application B 122B into a co-display mode with one another. Initially, as depicted in the display interface 1230 of FIG. 12B, the software application A 122A causes a display of a transparent overlay user interface element 1210 over an overlay region of the first application interface 1201. Moreover, as further depicted in the display interface 1230 of FIG. 12B, the software application B 122B causes a display of a second application interface 1204 associated with the software application B 122B over the overlay region. While the overlay user interface element 1210 is depicted as being smaller than the second application interface 1204 associated with the software application B, a person of ordinary skill in the relevant technology will recognize that the overlay user interface element 1210 may be smaller than, larger than, and/or equal in size to the overlay user interface element 1210 associated with the software application A 122A.

As depicted in the display interface 1250 of FIG. 12C, after detecting that the software application B 122B is in the active display mode (e.g., by communicating with the software application B 122B, for example through communications via the operating system 121 and/or through non-operating-system-based communication inter-application mechanisms such as a network-based inter-application communication mechanism), the software application A 122A may update the first application interface 1201 accordingly to accommodate the active display of the software application B 122B via the second application interface 1204. While FIG. 12C depicts an updating of the first application interface 1201 that includes a resizing of the one or more user interface elements associated with the first application interface 1201, a person of ordinary skill in the relevant technology will recognize that such an updating may include one or more of hiding of and/or transformations of any user interface elements associated with the first application interface 1201 as well as generation of an entirely new application interface suitable for the particular size and display parameters of the co-display mode with the software application B 122B.

Performing Interface Interactions Between Software Application Interfaces

FIG. 13 is a transmission flow diagram of an example process 1300 for performing interface interactions between two software applications that are in a co-display mode with each other. Via the various operations of the example process 1300, a system of one or more computers can enable a variety of co-display interaction functionalities between two or more software applications. Although the example process 1300 is framed and described with reference to two software applications, a person of ordinary skill in the relevant field will recognize that the process can be implemented using three or more software applications.

The process 1300 begins at operations 1311-1312 when the software application A 122A transmits an interface interaction notification to the operating system 121 and the operating system 121 transmits (e.g., forwards) the interface interaction notification to the software application B 122B. In some embodiments, the software application A 122A first obtains an interface interaction request associated with the second application, wherein the interface interaction request is originated in a computing context associated with the software application A 122A. In some of those embodiments, after obtaining the interface interaction request, the software application A 122A generates an interface interaction notification based on the interface interaction request and causes (e.g., via the operating system 121) the client device 120 to transmit the interface interaction notification to the software application B 122B. In some embodiments, obtaining an interface interaction request includes obtaining a storage location modification request, wherein the storage location modification request is originated in an application interface for the software application A 122A. In some embodiments, obtaining an interface interaction request includes obtaining a data content modification request, wherein the data content modification request is originated in an application interface for the software application A 122A.

In some embodiments, the interface interaction notification indicates one or more targeted software applications of software applications on the client device 120. In some of those embodiments, the operating system 121 transmits the interface interaction notification to the indicated targeted software applications only. In some embodiments, the operating system 121 transmits the interface interaction notification to each software application operating on the client device 120 and/or to each software application on the client device 120. Although the exemplary implementation of FIG. 12 merely discusses transmission of an interface interaction notification to the operating system 121 as a method for causing the client device 120 to transmit the interface interaction notification to the software application B 122B, a person of ordinary skill in the relevant field will recognize that any technique for causing the client device 120 to transmit the interface interaction notification to the software application B 122B may be suitable.

At operations 1313-1314, each of the software application A 122A and the software application B 122B transmit display update requests to the operating system 121. The display update request transmitted by the software application A 122A indicates any desired changes to any application interfaces associated with the software application A 122A as a result of the interface interactions defined by the interface interaction notification. In some embodiments, if there are no desired changes to any application interfaces associated with the software application A 122A as a result of the interface interactions defined by the interface interaction notification, the software application A 122A may transmit no display update requests. The display update request transmitted by the software application B 122B indicates any desired changes to any application interfaces associated with the software application B 122B as a result of the interface interactions defined by the interface interaction notification. Although the exemplary implementation of FIG. 12 merely discusses transmission of updated display requests to the operating system 121 as a method for causing the client device 120 to update application interfaces, a person of ordinary skill in the relevant field will recognize that any technique for causing the client device 120 to update application interfaces may be suitable.

FIG. 14 is a flowchart diagram of an example process 1400 for processing an interface interaction request originated in a software application by the software application. The process 1400 will be described with reference to the software application A 122A, which is presumed to be in a co-display mode with the software application B 122B. However, a person of ordinary skill in the relevant field will recognize that the process 1400 may be performed by any software application that is in a co-display mode with any other group of one or more software applications.

The process 1400 begins at operation 1401 when the software application A 122A obtains an interface interaction request associated with the software application B 122B. For example, the interface interaction request may be a request by an end-user to move a file from a first folder being displayed by a first application interface associated with the software application A 122A to a second folder which may be displayed by a second application interface associated with the software application B 122B. As another example, the interface interaction request may be a request by an end-user to move a file from a first folder being displayed by a first application interface associated with the software application A 122A to a second folder that the software application A 122A knows is being displayed by a second application interface associated with the software application B 122B. As yet another example, the interface interaction request may be a request by an end-user to modify data being displayed by a first application interface associated with the software application A 122A, where the modified data may be relevant to data currently being displayed by a second application interface associated with the software application B 122B. As a further example, the interface interaction request may be a request by an end-user to modify data being displayed by a first application interface associated with the software application A 122A, where the software application A 122A knows that modified data is relevant to data currently being displayed by a second application interface associated with the software application B 122B.

At operation 1402, the software application A 122A generates an interface interaction notification based on the interface interaction request. In some embodiments, the interface interaction notification is configured to notify any software application that is currently in a co-display mode with the software application A 122A (a group that here only includes the software application B 122B) of the interface interaction request. In some embodiments, the interface interaction notification is configured to notify a particular software application that is currently in a co-display mode with the software application A 122A (a group that here only includes the software application B 122B) of the interface interaction request, where an application interface of the particular software application is determined to have been affected by the interface interaction request.

For example, if the interface interaction request is an attempt to drag a file from a first folder being displayed by a first application interface associated with the software application A 122A to a second folder that the software application A 122A knows is being displayed by a second application interface associated with the software application B 122B, the interface interaction notification may include an indication of the software application B 122B as the target of the interface interaction request as well as an indication of the intended folder modification request. As another example, if the interface interaction request is an attempt to drag a file from a first folder being displayed by a first application interface associated with the software application A 122A to an unknown location, the interface interaction notification may simply include an indication of the intended folder modification request without any target information. As a further example, if the interface interaction request is a requested modification to first data being displayed by a first application interface associated with the software application A 122A, and if the software application A 122A knows that modified data is relevant to second data currently being displayed by a second application interface associated with the software application B 122B, the interface interaction notification may include an indication of the software application B 122B as the target of the interface interaction request as well as an indication of the intended data modification request. As a further example, if the interface interaction request is a requested modification to first data being displayed by a first application interface associated with the software application A 122A, and if the software application A 122A does not relationships of the first data with data being displayed by other co-displayed applications, the interface interaction notification may include an indication of the intended data modification request without including any target indications.

At operation 1403, the software application A 122A generates an interface update determination based on the interface interaction request. In some embodiments, the software application A 122A determines how any application interfaces associated with the software application A 122A should be changed based on the interface interaction request. For example, in response to an interface interaction request associated with a user-requested moving of a file from a first folder being displayed by a first application interface of the software application A 122A, the software application A 122A may generate an interface update determination that requests removal of a user interface element associated with the file from the first application interface.

At operation 1404, the software application A 122A generates a display update request based on the interface update determination. In some embodiments, generating the second display update request is performed in response to obtaining an interaction relevance confirmation associated with the software application B 122B, e.g., an interaction relevance confirmation indicates that a file in a first folder being displayed by a first application interface of the software application A 122A has indeed been moved to a second folder being displayed by a second application interface of the software application B 122B. In some embodiments, after generating the display update request based on the interface update determination, the software application A 122A causes the client device 120 to update display of a first application interface associated with the software application A 122A in accordance with the display update request, e.g., by transmitting the display update request to the operating system 121.

FIG. 15 is a flowchart diagram of an example process 1500 for processing an interface interaction notification associated with a first software application by a second software application. The process 1500 will be described as being performed by the software application B 122B, which is presumed to be in a co-display mode with the software application A 122A. However, a person of ordinary skill in the relevant field will recognize that the process 1500 may be performed by any software application that is in a co-display mode with any other group of one or more software applications.

The process 1500 begins at operation 1501 when the software application B 122B obtains an interface interaction notification associated with the software application A 122A. For example, the interface interaction notification may be generated by the software application A 122A in accordance with the techniques discussed in relation to operation 1402 of the process 1400 of FIG. 14.

At operation 1502, the software application B 122B generates an interface update determination for an application interface associated with the software application B 122B based on the received interface interaction notification. For example, in response to an interface interaction notification associated with a user-requested moving of a file from a first folder being displayed by a first application interface of the software application A 122A, the software application B 122B may determine (e.g., based on end-user activity with respect to an application interface of the software application B 122B at a time sufficiently close to a time of the interface interaction notification) that the target of user-requesting file moving is a second folder being displayed by a second application interface of the software application B 122B. In response, the software application B 122B may generate an interface update determination that indicates a request to add a user interface element associated with the file to the second application interface.

At operation 1503, the software application B 122B generates a display request based on the interface update determination. In some embodiments, after generating the display update request based on the interface update determination, the software application B 122B causes the client device 120 to update display of a second application interface associated with the software application B 122B in accordance with the display update request, e.g., by transmitting the display update request to the operating system 121. In some embodiments, in response to causing the client device 120 to update display of the second application interface in accordance with the display update request, the software application B 122B generates an interaction relevance confirmation and causes the client device 120 to transmit the interaction relevance confirmation to the software application A 122A.

Using the techniques described in relation to FIGS. 13-15, a computing device (e.g., the client device 120) can perform a variety of interface-interaction-related co-display functionalities, such as the example storage location modification request depicted using displays interfaces 1600 and 1650, which are depicted in FIGS. 16A-16B respectively. Both of the display interfaces 1600 and 1650 depict a first application interface 1601 for the software application A 122A, a second application interface 1604 for the software application B 122B, the cursor user interface 1603, and the user interface elements 1602A-1602B for the software application A 122A and the software application B 122B respectively.

As depicted in FIG. 16A, the display interface 1600 depicts, in the first application interface 1601, user interface element 1601A associated with a File A which is dragged by the cursor user interface 1603 from the first application interface 1601 to the second application interface 1604. In response to this dragging action by an end-user of the client device 120, the software application A 122A may generate an interface interaction notification and cause the generated interface interaction notification to be transmitted to the software application B 122B. In response to transmission of the interface interaction notification and/or operations related to transmission of the interface interaction notification, both the software application A 122A and the software application B 122B update their respective application interfaces. Thus, as depicted in FIG. 16B, the display interface 1600 depicts the first application interface 1601 without the user interface element 1601A and the second application interface 1604 with a user interface element 1604A for the File A.

Additional Implementation Details

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. A computer-implemented method for enabling a first software application executing on a computing device and being displayed within a first application interface of a display device associated with the computing device to enter a co-display mode with a second software application, the computer-implemented method comprising:

obtaining a co-display notification associated with the second software application executing on the computing device, wherein the co-display notification identifies the second software application;

determining, based on the co-display notification and a co-display protocol associated with the first software application, an overlay region defined within the first application interface;

generating a display update request, wherein the display update request is configured to cause the computing device to define a transparent overlay user interface element over the overlay region for displaying, within the first application interface, a second application interface associated with the second software application;

causing the computing device to transmit co-display information to the second software application; and causing the computing device to update display of the first application interface in accordance with the display update request.

2. The computer-implemented method of claim 1, wherein:

the first software application is executing in an active display mode, the second software application is executing in a non-active display mode, and the co-display notification indicates an active display request associated with the second software application, wherein the active display request is configured to cause the second software application to transition from the active display mode to the non-active display mode.

3. The computer-implemented method of claim 1, wherein determining the overlay region comprises:

generating one or more co-display arrangements for the first software application and the second software application, wherein each co-display arrangement is associated with a candidate overlay region within the first application interface;

determining a predicted arrangement utility value based on predicted end-user experience quality for each co-display arrangement of the one or more co-display arrangements; and determining the overlay region based on each predicted arrangement utility value for a co-display arrangement of the one or more co-display arrangements.

4. The computer-implemented method of claim 3, wherein determining the overlay region based on each predicted arrangement utility value comprises:

selecting the candidate overlay region for a particular co-display arrangement of the one or more co-display arrangements having a lowest predicted arrangement utility value as the overlay region.

5. The computer-implemented method of claim 3, wherein determining the predicted arrangement utility value for a particular co-display arrangement of the one or more co-display arrangements comprises:
   identifying a plurality of user interface elements associated with the particular co-display arrangement;
   for each user interface element of the plurality of user interface elements, determining a predicted element utility value; and
   determining the predicted arrangement utility value for the particular co-display arrangement based on each predicted element utility value for a user interface element of the plurality of user interface elements.

6. The computer-implemented method of claim 5, wherein determining the predicted element utility value for a particular user interface element of the plurality of user interface elements comprises:
   given the particular co-display arrangement, determining an element co-display prominence value for the particular user interface element based on an arranged display size of the particular user interface element and an arranged display region of the particular user interface element;
   obtain an element display significance value for the user interface element; and
   determining the predicted element utility value for the particular user interface element given the particular co display arrangement based on the element co-display prominence value and the element display significance value.

7. The computer-implemented method of claim 1, wherein determining the overlay region comprises:
   identifying one or more interface regions of the first application interface;
   for each interface region of the one or more interface regions, selecting a predicted region significance value; and
   selecting the overlay region based on each predicted region significance value for an interface region of the one or more interface regions.

8. The computer-implemented method of claim 1, further comprising:
   obtaining an interface interaction request associated with the second software application, wherein the interface interaction request is originated in the first application interface;
   generating an interface interaction notification based on the interface interaction request; and
   causing the computing device to transmit the interface interaction notification to the second software application.

9. The computer-implemented method of claim 8, further comprising:
   generating an interface update determination for the first application interface based on the interface interaction request;
   generating a second display update request based on the interface update determination; and
   causing the computing device to update display of the first application interface in accordance with the second display update request.

10. The computer-implemented method of claim 9, wherein generating the second display update request is performed in response to obtaining an interaction relevance confirmation associated with the second software application.

11. The computer-implemented method of claim 8, wherein obtaining the interface interaction request associated with the second software application comprises:
   obtaining a storage location modification request, wherein the storage location modification request defines an end-user request to adjust one or more stored data items that are associated with a first location of the first software application to become associated with a second location of the second software application.

12. The computer-implemented method of claim 8, wherein obtaining the interface interaction request associated with the second software application comprises:
   obtaining a data content modification request, wherein the data content modification request is originated in the first application interface.

13. The computer-implemented method of claim 1, further comprising:
   obtaining an interface interaction notification, wherein the interface interaction notification is originated in a second user application interface associated with the second software application, and wherein the second user application interface is in the co-display mode with the first application interface;
   generating an interface update determination for the first application interface based on the interface interaction notification;
   generating a second display update request based on the interface update determination; and
   causing the computing device to update display of the first application interface in accordance with the second display update request.

14. The computer-implemented method of claim 13, further comprising:
   in response to causing the computing device to update display of the first application interface in accordance with the second display update request, generating an interaction relevance confirmation based on the second display update request and causing the computing device to transmit the interaction relevance confirmation to the second software application.

15. The computer-implemented method of claim 1, wherein the co-display information identifies the overlay region.

16. The computer-implemented method of claim 1, wherein causing the computing device to update display of the first application interface in accordance with the display update request comprises:
   detecting that the second software application is being displayed within the overlay region, and
   in response to detecting that the second software application is being displayed within the overlay region, updating display of the first application interface to cease display of the first application interface within the overlay region.

17. The computer-implemented method of claim 1, wherein causing the computing device to update display of the first application interface in accordance with the display update request comprises causing the computing device to display the first application interface in the co-display mode with the second software application.

18. A computer-implemented method for enabling co-display functionalities for a first software application executing on a computing device in a non-active display mode, the computer-implemented method comprising:

obtaining a display request for the first software application;

in response to obtaining the display request, obtaining co-display information associated with the computing device;

determining whether the co-display information defines an overlay region within a currently-displayed application interface associated with a second software application, wherein the overlay region is configured to display support a transparent overlay user interface element for displaying a first application interface associated with the first software application within the currently-displayed application interface associated with the second software application; and in response to determining that the computing device defines the overlay region:

generating a display update request, wherein the display update request is configured to cause the computing device to display the first application interface associated with the first software application on the overlay region; and causing the computing device to update display of the currently-displayed application interface in accordance with the display update request.

19. An apparatus for enabling co-display functionalities for a first software application executing on a computing device and being displayed within a first application interface of a display device associated with the computing device, the apparatus comprising at least one processor and at least one memory including program code, the at least one memory and the program code configured to, with the at least one processor, cause the apparatus to at least:

obtain a co-display notification associated with a second software application executing on the computing device, wherein the co-display notification identifies the second software application;

determine, based on the co-display notification and a co-display protocol associated with the first software application, an overlay region defined within the first application interface;

generate a display update request, wherein the display update request is configured to cause the computing device to define a transparent overlay user interface element over the overlay region for displaying, within the first application interface, a second application interface associated with the second software application;

cause the computing device to transmit co-display information to the second software application, wherein the co-display information identifies the overlay region; and cause the computing device to update display of the first application interface in accordance with the display update request.

20. A computer program product for enabling co-display functionalities for a first software application executing on a computing device and being displayed within a first application interface of a display device associated with the computing device, the computer program product comprising at least one non-transitory computer-readable storage medium having computer-readable program code portions stored therein, the computer-readable program code portions configured to:

obtain a co-display notification associated with a second software application executing on the computing device, wherein the co-display notification identifies the second software application;

determine, based on the co-display notification and a co-display protocol associated with the first software application, an overlay region defined within the first application interface;

generate a display update request, wherein the display update request is configured to cause the computing device to define a transparent overlay user interface element over the overlay region for displaying, within the first application interface, a second application interface associated with the second software application;

cause the computing device to transmit co-display information to the second software application, wherein the co-display information identifies the overlay region; and cause the computing device to update display of the first application interface in accordance with the display update request.

* * * * *

UNITED STATES PATENT AND TRADEMARK OFFICE
CERTIFICATE OF CORRECTION

PATENT NO. : 10,942,625 B1
APPLICATION NO. : 16/564419
DATED : March 9, 2021
INVENTOR(S) : Li et al.

Page 1 of 1

It is certified that error appears in the above-identified patent and that said Letters Patent is hereby corrected as shown below:

In the Claims

Column 41,
Lines 29 and 30, "co display" should read --co-display--.

Column 43,
Line 10, "display support" should read --support--.

Signed and Sealed this
Eighteenth Day of October, 2022

Katherine Kelly Vidal
*Director of the United States Patent and Trademark Office*